(12) United States Patent
Ogino

(10) Patent No.: US 10,598,950 B2
(45) Date of Patent: Mar. 24, 2020

(54) IMAGE PROJECTION APPARATUS AND MOVABLE BODY

(71) Applicant: Shimpei Ogino, Kanagawa (JP)

(72) Inventor: Shimpei Ogino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/294,966

(22) Filed: Mar. 7, 2019

(65) Prior Publication Data

US 2019/0285906 A1 Sep. 19, 2019

(30) Foreign Application Priority Data

Mar. 19, 2018 (JP) .................................. 2018-050930

(51) Int. Cl.
*G03B 27/72* (2006.01)
*G02B 27/28* (2006.01)
(Continued)

(52) U.S. Cl.
CPC ............ *G02B 27/286* (2013.01); *B60K 35/00* (2013.01); *G02B 27/0101* (2013.01); *G02B 27/0172* (2013.01); *G02B 27/0179* (2013.01); *B60K 2370/334* (2019.05); *B60K 2370/349* (2019.05); *G02B 2027/011* (2013.01);
(Continued)

(58) Field of Classification Search
CPC .............. G02B 27/286; G02B 27/0172; G02B 27/0179; G02B 2027/0145; G02B 2027/0181; G02B 2027/0183; B60K 2370/334
See application file for complete search history.

(56) References Cited

U.S. PATENT DOCUMENTS 10,031,343 B2 7/2018 Saisho et al.
2016/0320616 A1 11/2016 Ichii
(Continued)

FOREIGN PATENT DOCUMENTS

EP 2944986 A1 11/2015
EP 3 088 935 A1 11/2016
(Continued)

OTHER PUBLICATIONS

Extended European Search Report dated Aug. 5, 2019, in Patent Application No. 19159756.6, 10 pages.

*Primary Examiner* — Peter B Kim
(74) *Attorney, Agent, or Firm* — Oblon, McClelland, Maier & Neustadt, L.L.P.

(57) ABSTRACT

An image projection apparatus includes an intermediate image forming member configured to form an intermediate image from light emitted by a light source device; and a plural-film optical member on which image light that forms the intermediate image is incident. The image projection apparatus uses the image light that is incident on the plural-film optical member to project an image, an image rotational position relationship in a rotational direction around an image center axis between the image that is projected and the intermediate image is such that a difference is present in image rotational positions, and the plural-film optical member is set in such a manner that a polarization axis of the image light incident on the plural-film optical member is parallel or perpendicular to a plane of incidence of the image light with respect to the plural-film optical member.

20 Claims, 14 Drawing Sheets

(51) Int. Cl.
*B60K 35/00* (2006.01)
*G02B 27/01* (2006.01)

(52) U.S. Cl.
CPC ............... *G02B 2027/0118* (2013.01); *G02B 2027/0145* (2013.01); *G02B 2027/0159* (2013.01); *G02B 2027/0181* (2013.01); *G02B 2027/0183* (2013.01)

(56) References Cited

U.S. PATENT DOCUMENTS

| | | |
|---|---|---|
| 2018/0081172 A1 | 3/2018 | Liu et al. |
| 2018/0252916 A1 | 9/2018 | Nakamura et al. |
| 2018/0267306 A1 | 9/2018 | Nakamura et al. |

FOREIGN PATENT DOCUMENTS

| | | | |
|---|---|---|---|
| EP | 3385775 A1 * | 10/2018 | ............. B60K 35/00 |
| JP | 2015-7763 A | 1/2015 | |
| JP | 2015-232693 | 12/2015 | |
| JP | 2016-197173 | 11/2016 | |
| JP | 2016-206612 | 12/2016 | |
| WO | WO 2016/157815 A1 | 10/2016 | |
| WO | WO 2017/094333 A1 | 6/2017 | |

* cited by examiner

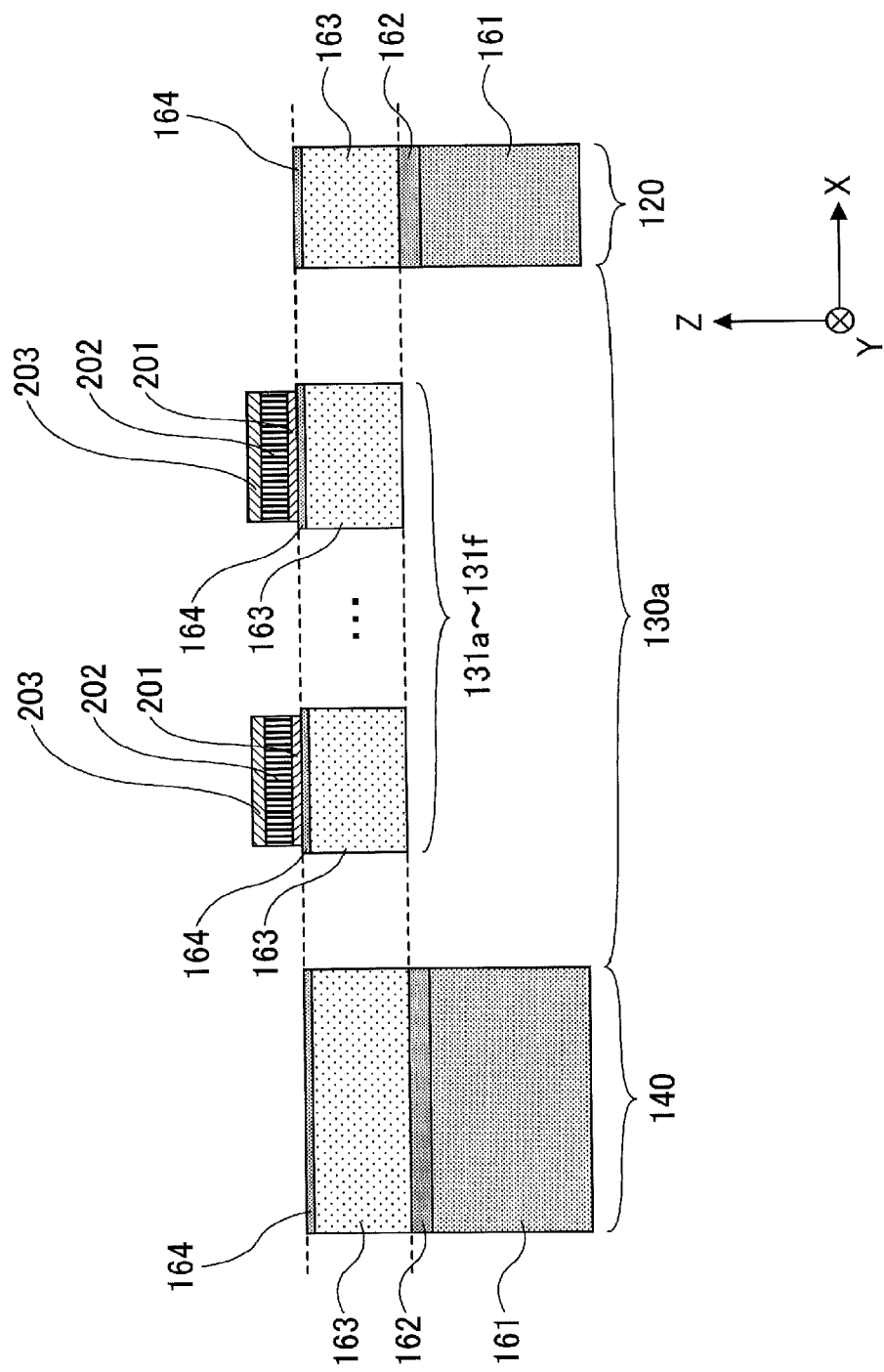

FIG.10
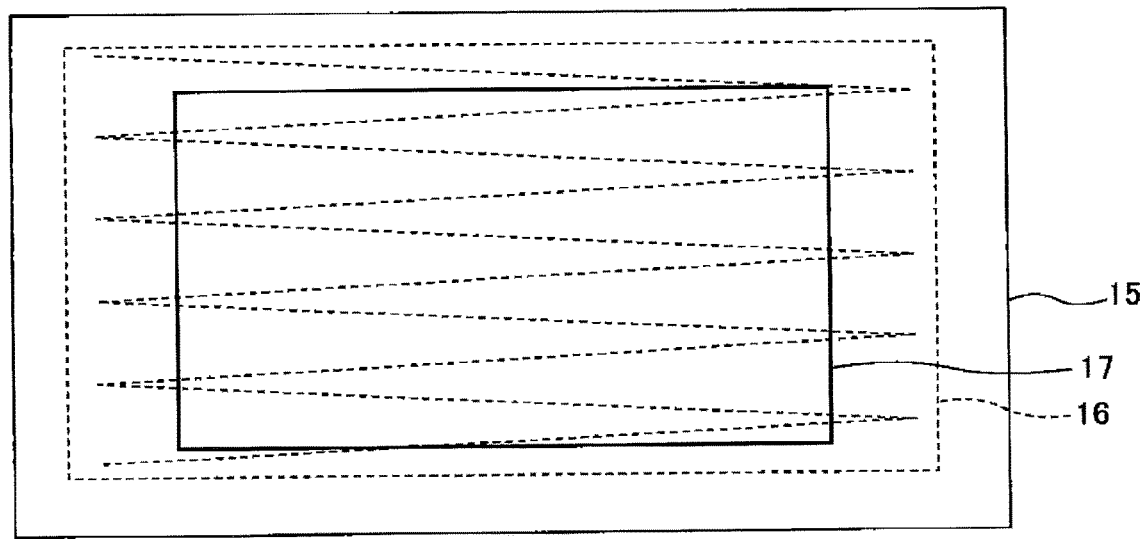
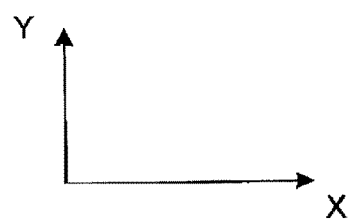
FIG.11
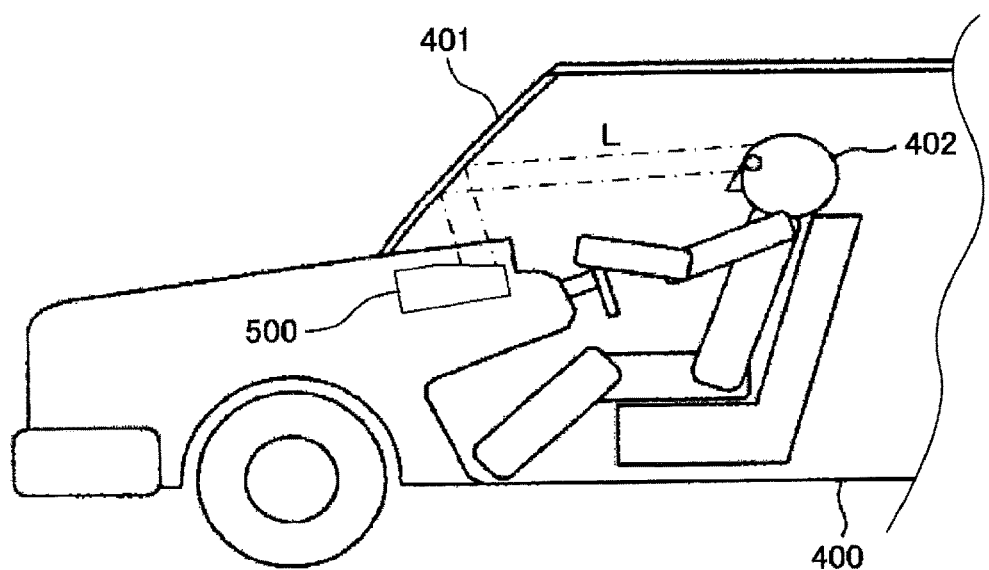

IMAGE PROJECTION APPARATUS AND MOVABLE BODY

BACKGROUND OF THE INVENTION

1. Field of the Invention

The present invention relates to an image projection apparatus and a movable body.

2. Description of the Related Art

An image projection apparatus that forms an intermediate image on an intermediate image forming member from light emitted by a light source device, causes the intermediate image light to pass through a plural-film optical member where a plurality of optical films are laminated to obtain a projected image, and projects the projected image, is known.

For example, Japanese Unexamined Patent Application Publication No. 2016-197173 (Patent document 1) discloses a head-up display (HUD) (an image projection apparatus) including a liquid-crystal panel (an intermediate image forming member) forming an intermediate image from light emitted by a light source device; and a cold mirror (a plural-film optical member) reflecting image light exiting the liquid-crystal panel toward the windshield of a vehicle. The HUD further includes a phase shifter such as a phase difference film on the optical path between the liquid-crystal panel and the cold mirror to convert image light to be incident on the cold mirror into an s-wave (i.e., image light that is s-polarized light upon being reflected by the cold mirror).

Thereby, according to a theory, an incidence of a p-wave (i.e., image light that is p-polarized light upon being reflected by the cold mirror) onto the cold mirror is suppressed, and as a result, it is possible to suppress a change on a per-wavelength basis of the polarization state of light exiting the cold mirror occurring due to the phase difference between the polarized light components of an the s-wave and the p-wave incident on the cold mirror. Thus, according to the theory, it is possible to cause a user to see a projected image having colors close to the colors in the intermediate image.

Note that an expression such as "image light that is p-polarized light upon being reflected by the cold mirror" will be referred to by an expression such as "p-polarized light with respect to reflection by the cold mirror". In the same way, an expression such as "image light that is s-polarized light upon being reflected by the cold mirror" will be referred to by an expression such as "s-polarized light with respect to reflection by the cold mirror".

SUMMARY OF THE INVENTION

According to one aspect of the present invention, an image projection apparatus includes an intermediate image forming member configured to form an intermediate image from light emitted by a light source device; and a plural-film optical member on which image light that forms the intermediate image is incident. The image projection apparatus uses the image light that is incident on the plural-film optical member to project an image, an image rotational position relationship in a rotational direction around an image center axis between the image that is projected and the intermediate image is such that a difference is present in image rotational positions, and the plural-film optical member is set in such a manner that a polarization axis of the image light incident on the plural-film optical member is parallel or perpendicular to a plane of incidence of the image light with respect to the plural-film optical member.

Other objects, features, and advantages of the present invention will become more apparent from the following detailed description when read in conjunction with the accompanying drawings.

BRIEF DESCRIPTION OF THE DRAWINGS

FIG. 7 illustrates a sectional view of the light deflector illustrated in FIG. 5 taken along a Q-Q' line;

FIG. 10 illustrates optical scanning performed by the intermediate image forming apparatus;

FIG. 11 is a schematic diagram illustrating one example of an automobile where a head-up display to which the intermediate image forming apparatus is applied is installed;

DETAILED DESCRIPTION OF THE EMBODIMENTS

According to image projection apparatuses in the related art such as the HUD disclosed by Patent document 1, normally, an arrangement is made such that an image rotational position relationship in a rotational direction around the image center axis between a projected image and an intermediate image is such that there is no difference in the image rotational positions. As a result, for a case where polarized image light of which the polarization axis (a direction of an electric field vector) has a predetermined direction relative to a projected image should be projected, an arrangement may be made such that polarized image light of which the polarization axis has the same direction relative to an intermediate image will exit an intermediate image forming member. Thereby, it is possible to project polarized image light of which the polarization direction has the predetermined direction relative to a projected image. For example, for a case where polarized image light of which the polarization axis is parallel to a horizontal direction of a projected image should be projected, an arrangement may be made such that image light of which the polarization axis has a direction parallel to a horizontal direction of an intermediate image will exit the intermediate image forming member.

Under a special situation where, for example, an image is projected onto an asymmetrically curved surface such as the windshield of a vehicle, it is advantageous, from a viewpoint of improving quality of an projected image, to make an arrangement such that the image rotational position relationship between a projected image and an intermediate image is such that there is a difference in the rotational positions. However, in particular in such an arrangement, a problem may occur. That is, for a case where polarized image light exiting an intermediate image forming member will be projected through a plural-film optical member such as a cold mirror where a plurality of optical films are laminated, projected image light of which the polarization axis has a predetermined direction relative to the projected image cannot be projected and a problem such as degradation in brightness of the projected image may occur.

An embodiment of the present invention has been devised in consideration of such a situation.

The embodiment of the present invention will now be described.

First, with reference to drawings, an image projection apparatus according to the embodiment will be described.

Figure 1:
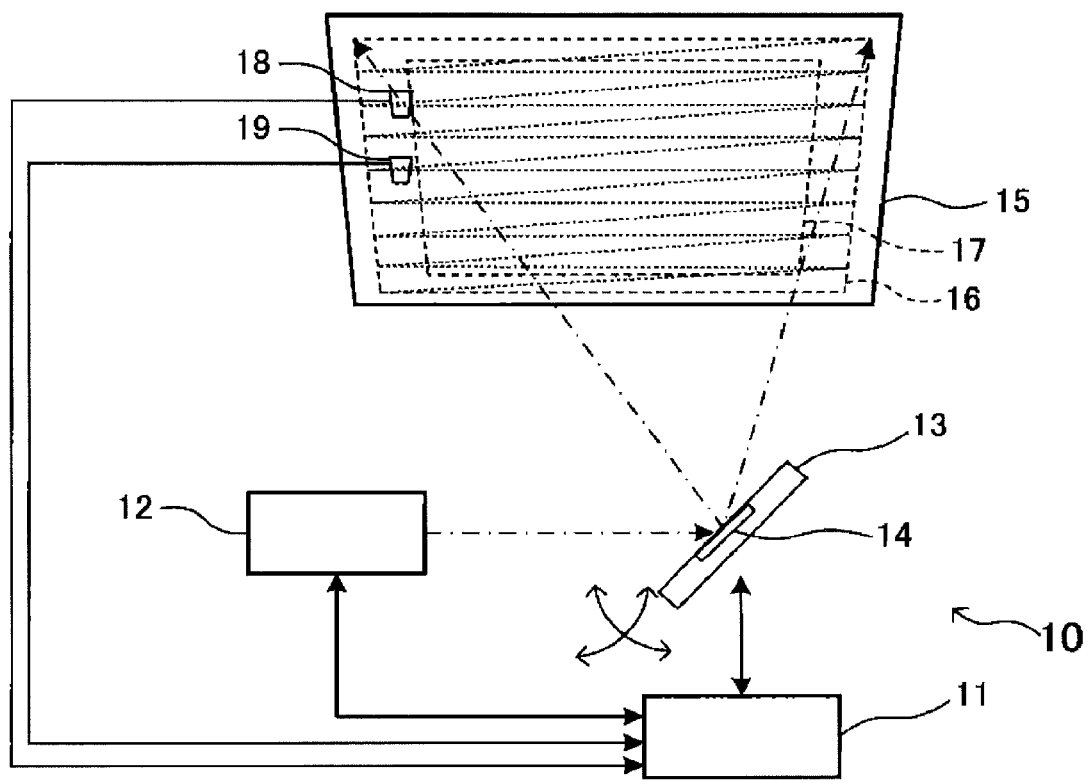
FIG. 1 is a schematic diagram illustrating one example of an intermediate image forming apparatus according to an embodiment.

FIG. 1 is a schematic diagram illustrating one example of an intermediate image forming apparatus installed in the image projection apparatus according to the present embodiment.

As illustrated in FIG. 1, the intermediate image forming apparatus 10, under control of a control device 11, deflects light emitted by a light source device 12 with a reflecting surface 14 of a light deflector 13 as an optical scanning member, and performs optical scanning on an intermediate screen member 15 as an intermediate image forming member to form an intermediate image. A scannable area 16 that is an area throughout which the light deflector 13 can perform optical scanning includes an effective scanning area 17.

The intermediate image forming apparatus 10 includes the control device 11, the light source device 12, the light deflector 13, a first photodetector 18, and a second photodetector 19.

The control device 11 is, for example, an electronic circuit including a CPU (Central Processing Unit), a FPGA (Field-Programmable Gate Array), and so forth. The light source device 12 is, for example, a laser device emitting laser light. The light deflector 13 is, for example, a MEMS (Micro Electromechanical System) device, which includes the reflecting surface 14 and drives the reflecting surface 14. The intermediate screen member 15 is, for example, a light divergence member, and, more specifically, a micro-lens array where micro-lenses are two-dimensionally arranged. Note that the intermediate screen member 15 may be another member such as a light divergence plate, and need not be a light divergence member. The first photodetector 18 and the second photodetector 19 are, for example, PD (Photo Diodes) that receive light and output light reception signals.

The control device 11 generates control signals for the light source device 12 and the light deflector 13 on the basis of optical scanning information (image information) obtained from an external apparatus or the like, and outputs driving signals to the light source device 12 and the light deflector 13 on the basis of the control signals. In addition, based on a signal output from the light source device 12, a signal output from the light deflector 13, a first light reception signal output from the first photodetector 18, and a second light reception signal output from the second photodetector 19, the control device 11 performs synchronization of the light source device 12 and the light deflector 13 and generates control signals.

The light source device 12 causes light sources to emit light on the basis of the driving signal input from the control device 11.

The light deflector 13 drives the reflecting surface 14 in at least either of single-axis directions (one-dimensional directions) and two-axis directions (two dimensional directions) on the basis of the driving signal input from the control device 11 to deflect light emitted from the light source device 12. Note that the driving signal is a signal having a predetermined driving frequency. The light deflector 13 has a predetermined natural frequency (also called resonance frequency).

Thus, for example, under control of the control device 11 based on the optical scanning information (the image information), the reflecting surface 14 of the light deflector 13 is driven in two-axis directions in a predetermined range, and light emitted by the light source device 12 and incident on the reflecting surface 14 is deflected to perform optical scanning. Thus, on the intermediate screen member 15, a desired intermediate image can be formed (projected).

According to the present embodiment, the intermediate image forming system is an optical scanning system. However, instead, the intermediate image forming system may be a system using a liquid-crystal display (LCD), a vacuum fluorescent display, or the like.

Note that the light deflector 13 and control of the light deflector 13 by the control device 11 will be described later in more detail.

Next, with reference to FIG. 2, a hardware configuration of one example of the intermediate image forming apparatus will be described.

Figure 2:
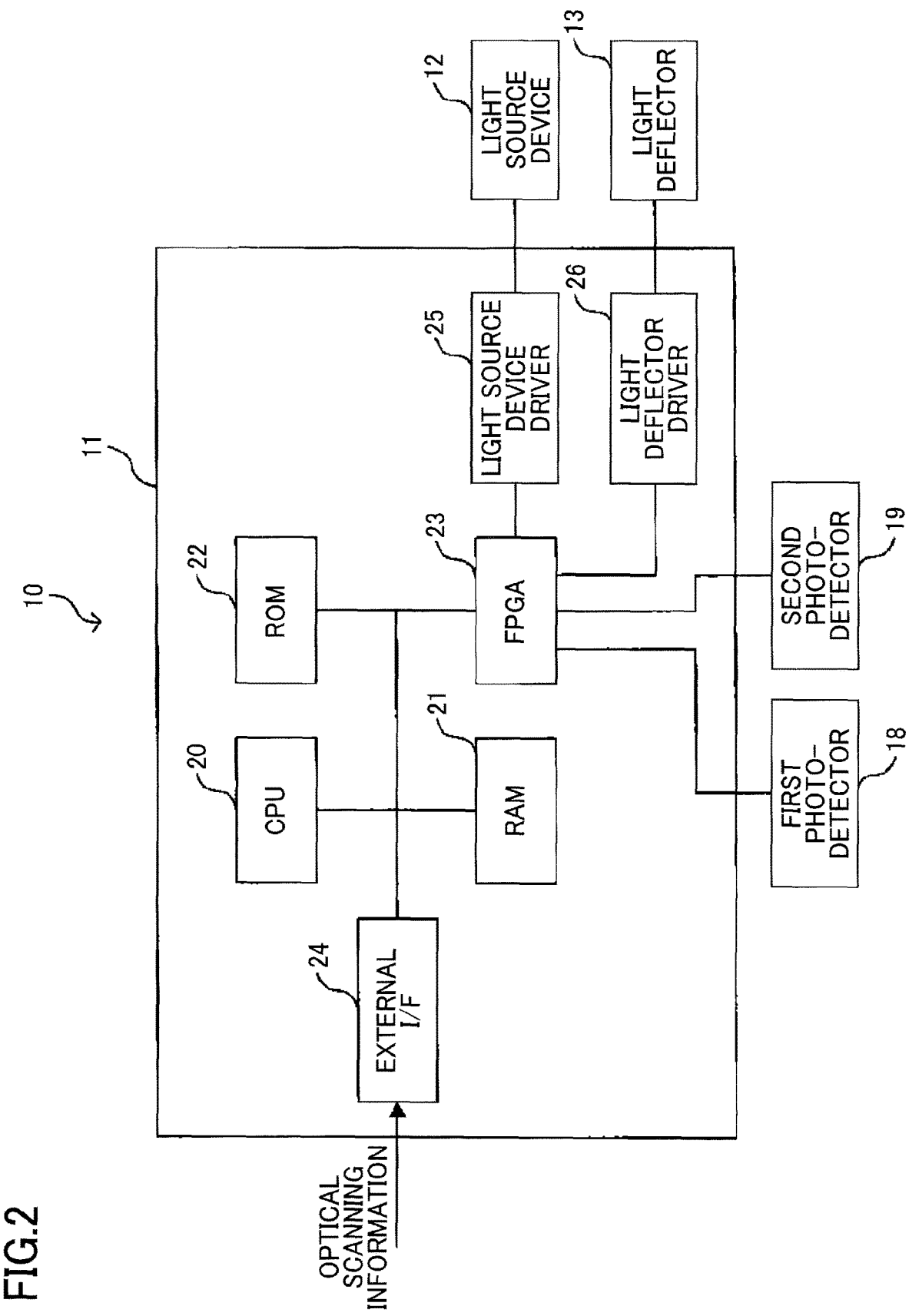
FIG. 2 illustrates a hardware configuration of one example of the intermediate image forming apparatus.

FIG. 2 illustrates a hardware configuration of one example of the intermediate image forming apparatus.

As illustrated in FIG. 2, the intermediate image forming apparatus 10 includes the control device 11, the light source device 12, the light deflector 13, the first photodetector 18, and the second photodetector 19, which are electrically connected with each other. The control device 11 will now be described in detail.

The control device 11 includes a CPU 20, a RAM (Random Access Memory) 21, a ROM (Read-Only Memory) 22, a FPGA 23, an external I/F 24, a light source device driver 25, and a light deflector driver 26.

The CPU 20 is an arithmetic and logic unit that reads a program and data from a storage device such as the ROM 22 onto the RAM 21, performs a process, and implements control of the entirety of and various functions of the control device 11. The RAM 21 is a volatile storage device temporarily storing a program and data.

The ROM 22 is a nonvolatile storage device that can store a program and data even after the power supply is turned off, and stores process implementing programs and data for the CPU 20 to control various functions of the intermediate image forming apparatus 10.

The FPGA 23 is a circuit that, under the control of the CPU 20, outputs control signals suitable for the light source device driver 25 and the light deflector driver 26. In addition, the FPGA 23 obtains output signals from the light source device 12 and the light deflector 13 via the light source device driver 25 and the light deflector driver 26, obtains light reception signals from the first photodetector 18 and the second photodetector 19, and generates control signals on the basis of the output signals and the light reception signals.

The external I/F 24 is, for example, an interface for external apparatuses, networks, and so forth. The external apparatuses include, for example, a host apparatus such as a PC (Personal Computer) and storage devices such as a USB memory, a SD card, a CD, a DVD, a HDD, and a SSD. In addition, the networks include, for example, a CAN (Controller Area Network) of an automobile, a LAN (Local Area Network), vehicle-to-vehicle communication, the Internet, and so forth. The external I/F 24 may have any configuration that enables connection or communication with the external apparatuses, and may include an external I/F 24 for each of the external apparatuses.

The light source device driver 25 is an electrical circuit outputting a driving signal such as a driving voltage to the light source device 12 according to an input control signal.

The light deflector driver 26 is an electrical circuit outputting a driving signal such as a driving voltage to the light deflector 13 according to an input control signal.

In the control device 11, the CPU 20 obtains optical scanning information from an external apparatus or a network through the external I/F 24. The CPU 20 has any configuration that can obtain optical scanning information, may have a configuration to store optical scanning information in the ROM 22 or the FPGA 23 of the control device 11, and may have a configuration to store optical scanning information in another storage device such as a SSD that may be provided in in the control device 11.

In this regard, optical scanning information is information indicating how to cause the light source device 12 and the light deflector 13 to perform optical scanning on the intermediate screen member 15, and, more specifically, for example, is image data to display an intermediate image through optical scanning.

Figure 3:
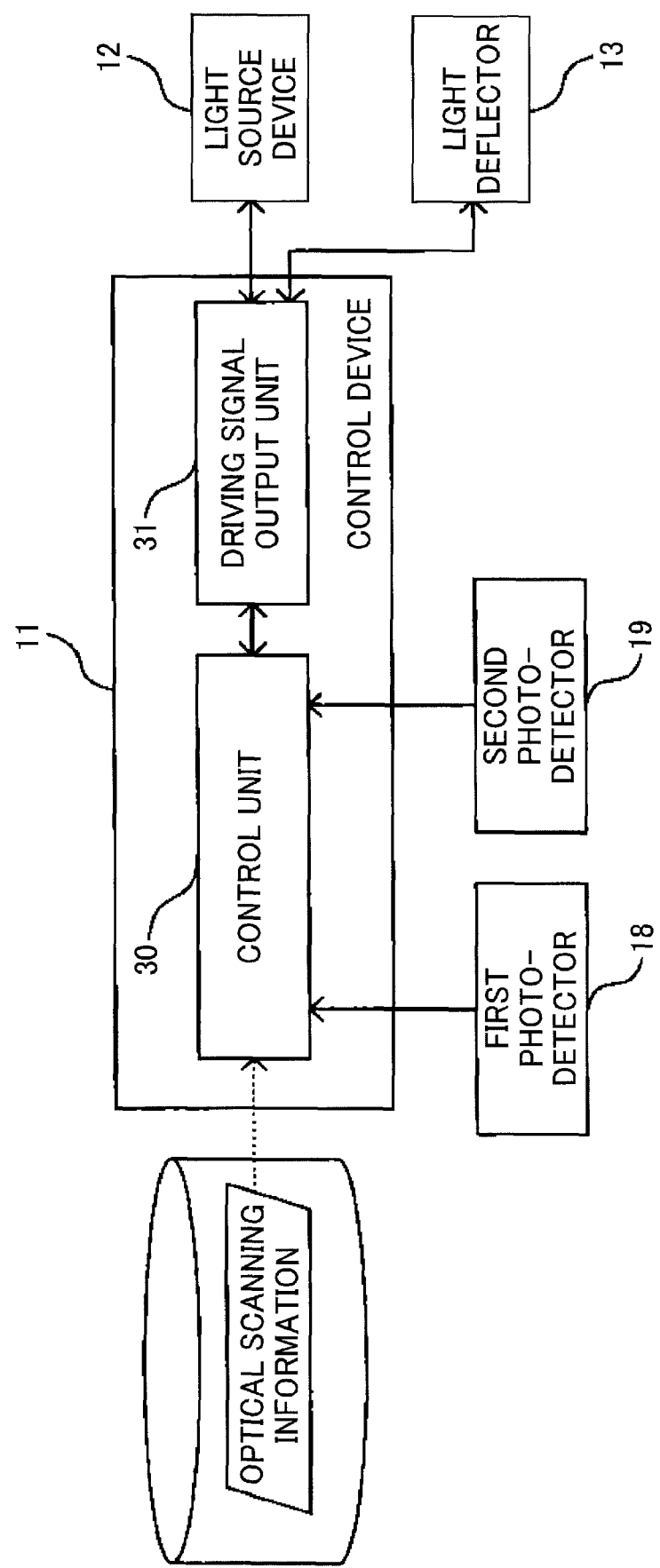
FIG. 3 is a functional block diagram illustrating one example of a control device of the intermediate image forming apparatus.

Next, with reference to FIG. 3, the functional block configuration of the control device 11 of the intermediate image forming apparatus 10 will be described. FIG. 3 illustrates the functional block configuration of the control device 11 of the intermediate image forming apparatus. The control device 11 according to the present embodiment can implement the functional configuration that will now be described using the hardware configuration illustrated in FIG. 2 according to instructions of the CPU.

As illustrated in FIG. 3, the control device 11 includes, as functions, a control unit 30 and a driving signal output unit 31. The control unit 30 is, for example, a control unit implemented by the CPU 20, the FPGA 23, and so forth, obtains optical scanning information and signals from various devices, generates control signals on the basis of the obtained information and signals, and outputs the generated signals to the driving signal output unit 31.

For example, the control unit 30 obtains image data from an external apparatus or the like as optical scanning information, generates a control signal from the image data through a process, and outputs the generated signal to the driving signal output unit 31. In addition, the control unit 30 obtains output signals of the light source device 12 and the light deflector 13 through the driving signal output unit 31 and generates a control signal on the basis of the output signals. Furthermore, the control unit 30 obtains light reception signals from the first photodetector 18 and the second photodetector 19, and generates a control signal on the basis of the light reception signals.

The driving signal output unit 31 is implemented by the light source device driver 25, the light deflector driver 26, and so forth, and outputs driving signals to the light source device 12 and the light deflector 13 on the basis of an input control signal. The driving signal output unit 31 functions as, for example, an applying unit that applies driving voltages to the light source device 12 and the light deflector 13. The driving signal output unit 31 may be provided for each target to which a driving signal is output.

Driving signals are signals to control driving of the light source device 12 and the light deflector 13. For example, concerning the light source device 12, driving signals are driving voltages to control light emitting timing and light emitting intensity of the light source device. Concerning the light deflector 13, for example, driving signals are driving voltages to control timing to drive the reflecting surface 14 of the light deflector 1 and control a range to drive the reflecting surface 14.

Next, with reference to FIG. 4, a process of the intermediate image forming apparatus 10 to perform optical scanning on the intermediate screen member 15 will be described.

Figure 4:
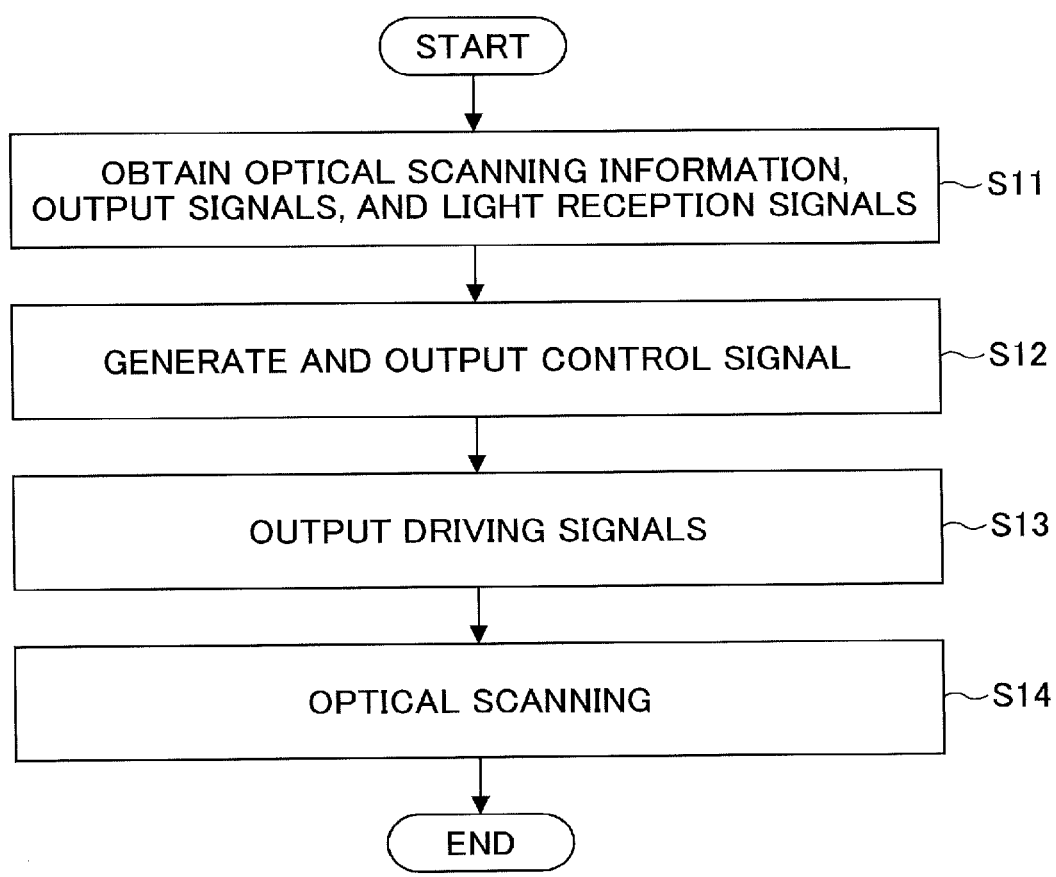
FIG. 4 is a flowchart illustrating one example of a process concerning the intermediate image forming apparatus.

FIG. 4 is a flowchart illustrating one example of a process concerning the intermediate image forming apparatus.

In step S11, the control unit 30 obtains optical scanning information from an external apparatus or the like. In addition, the control unit 30 obtains, through the driving signal output unit 31, respective output signals of the light source device 12 and the light deflector 13, and obtains respective light reception signals of the first photodetector 18 and the second photodetector 19.

In step S12, the control unit 30 generates a control signal from the obtained optical scanning information, the output signals, and the light reception signals, and outputs the control signal to the driving signal output unit 31. In this regard, at a time of starting of the process of FIG. 4, there may be a case where the output signals and the light reception signals cannot be obtained. Therefore, at a time of starting of the process of FIG. 4, a predetermined operation may be appropriately performed in another step.

In step S13, the driving signal output unit 31 outputs driving signals to the light source device 12 and the light deflector 13 on the basis of the input control signal.

In step S14, the light source device 12 emits light on the basis of the input driving signal; the light deflector 13 moves the reflecting surface 14 on the basis of the input driving signal. As a result of the light source device 12 and the light deflector 13 being thus driven, light is deflected in a desired direction and thus optical scanning is implemented.

Concerning the intermediate image forming apparatus 10 according to the present embodiment, the single control device 11 has units and functions to control the light source device 12 and the light deflector 13. However, it is also possible to provide separate control devices for the light source device and the control device, respectively.

In addition, concerning the intermediate image forming apparatus 10 according to the present embodiment, the single control device 11 has the functions of the control unit 30 and the driving signal output unit 31 for the light source device 12 and the light deflector 13. However, these functions may be provided by separate bodies. For example, in addition to the control device 11 including the control unit 30, a driving signal output device including the driving signal output unit 31 may be provided.

Figure 5:
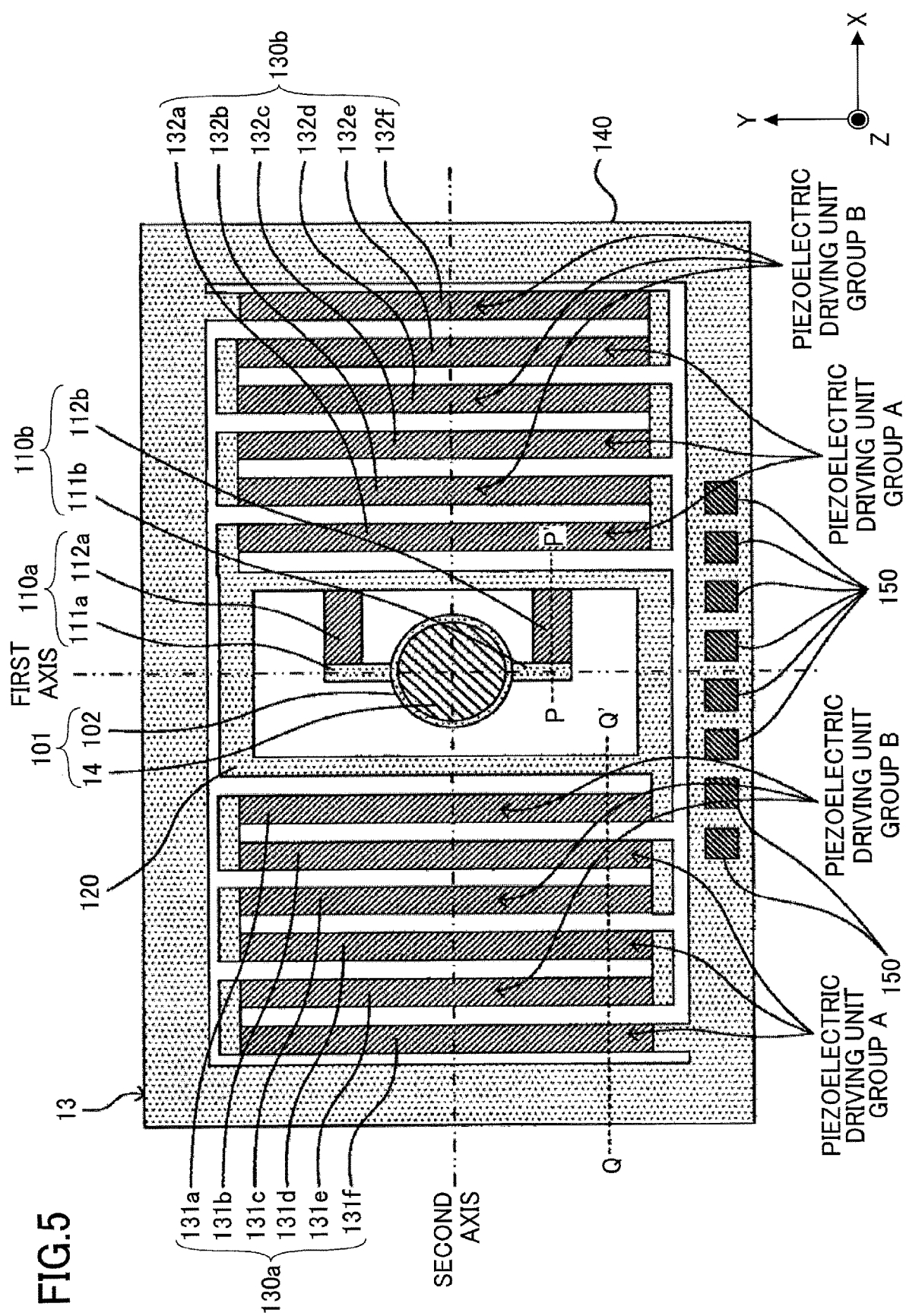
FIG. 5 is a plan view of one example of a light deflector of the intermediate image forming apparatus viewed from a +Z direction.
Figure 6:
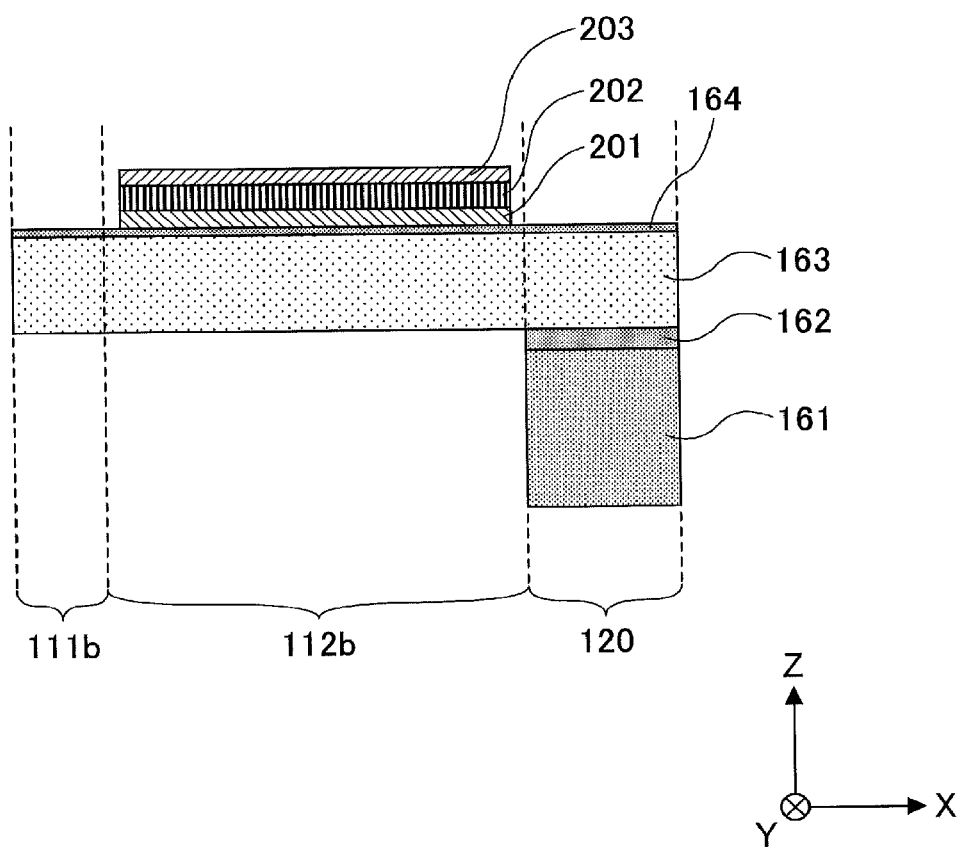
FIG. 6 illustrates a sectional view of the light deflector illustrated in FIG. 5 taken along a P-P' line.

Next, with reference to FIGS. 5-7, the light deflector 13 of a both-end-held type capable of performing two-axis light deflection will be described in detail. FIG. 5 illustrates a plan view of the light deflector 13. FIG. 6 illustrates a sectional view of the light deflector 13 taken along a P-P' line of FIG. 5. FIG. 7 illustrates a sectional view of the light deflector 13 taken along a Q-Q' line of FIG. 5.

As illustrated in FIG. 5, the light deflector 13 includes a mirror unit 101 reflecting incident light, first driving units 110a and 110b connected with the mirror unit 101 and driving the mirror unit 101 around a first axis parallel to the Y-axis, a first supporting unit 120 supporting the mirror unit 101 and the first driving units 110a and 110b, second driving units 130a and 130b connected with the first supporting unit 120 and driving the mirror unit 101 and the first supporting unit 120 around a second axis parallel to the X-axis, a second supporting unit 140 supporting the mirror unit 101 and the second driving units 130a and 130b, and electrode connecting members 150 electrically connected with the first driving units 110a and 110b, the second driving units 130a and 130b, and the control device 11.

In the light deflector 13, for example, the reflecting surface 14, first piezoelectric driving units 112a and 112b, second piezoelectric driving units 131a-131f and 132a-132f, the electrode connecting members 150, and so forth are formed on a single sheet of a SOI (Silicon On Insulator) substrate, and thereafter, an etching process or the like is performed to shape the substrate, and thus, these elements are integrated together. Note that forming of the elements may be performed after shaping of the SOI substrate or may be performed during shaping of the SOI substrate.

The SOI substrate is a substrate where, on a first silicon layer formed of single crystal silicon (Si), a silicon oxide layer 162 is provided. Thereafter, on the silicon oxide layer 162, further a second silicon layer formed of single crystal silicon is provided. Hereinafter, the first silicon layer is referred to as a silicon supporting layer 161 and the second silicon layer is referred to as a silicon active layer 163. Note that, the SOI substrate is used after sintering is performed to form a silicon oxide layer 164 on the silicon active layer 163.

The silicon active layer 163 is of a small thickness in the Z-axis direction with respect to the X-axis direction or the Y-axis direction. Therefore, the members made of the silicon active layer 163 or made of the silicon active layer 163 and the silicon oxide layer 164 function as resilient members having resilience. Note that, according to the present embodiment, the silicon oxide layer 164 is provided to inhibit electrical contact between the silicon active layer 163 and the bottom electrode 201. However, the silicon oxide layer 164 may be replaced with another material having insulating property.

Note that, the SOI substrate need not be planar and may have a curvature or the like. In addition, any substrate that can be integrally formed through an etching process or the like and can be formed to partially have resilience may be used to form the light deflector 13 instead of the SOI substrate.

The mirror unit 101 includes, for example, a circular mirror unit base 102 and a reflecting surface 14 formed on a face in the +Z direction of the mirror unit base 102. The mirror unit base 102 is made of, for example, a silicon active layer 163 and a silicon oxide layer 164.

The reflecting surface 14 includes, for example, a metal thin film containing aluminum, gold, silver, or the like. In addition, the mirror unit 101 may have a mirror unit reinforcement rib formed on the face of the mirror unit base 102 in the −Z direction.

The rib is made of, for example, a silicon supporting layer 161 and a silicon oxide layer 162 and can avoid distortion of the reflecting surface 14 otherwise occurring due to being driven.

The first driving units 110a and 110b include two torsion bars 111a and 111b each having one end connected with the mirror unit base 102 and extending in the first-axis direction to movably support the mirror unit 101; and first piezoelectric driving units 112a and 112b each having one end connected with the torsion bars 111a and 111b and having the other end connected with an inner section of the first supporting unit 120.

As illustrated in FIG. 6, the torsion bars 111a and 111b are made of silicon active layers 163 and silicon oxide layers 164. In addition, the first piezoelectric driving units 112a and 112b are formed in such a manner that, on the face of a resilient member being of a silicon active layer 163 and a silicon oxide layer 164, bottom electrodes 201, piezoelectric units 202, and top electrodes 203 are formed in the +Z direction in the stated order.

The top electrodes 203 and the bottom electrodes 201 are made of, for example, gold (Au), platinum (Pt), or the like. The piezoelectric units 202 are made of, for example, PZT (lead zirconate titanate) that is a piezoelectric material.

Returning to FIG. 5, the first supporting unit 120 is made of, for example, a silicon supporting layer 161, a silicon oxide layer 162, a silicon active layer 163, and a silicon oxide layer 164 and is a rectangular supporting member formed to surround the mirror unit 101.

The second driving units 130a and 130b include, for example, a plurality of second piezoelectric driving units 131a-131f and 132a-132f connected together in a folding manner. One end of each of the second driving units 130a and 130b is connected with an outer section of the first supporting unit 120 and the other end is connected with an inner section of the second supporting unit 140. Such a meandering structure is called a meander structure. In addition, a structure, such as the second piezoelectric driving units 131a-131f and 132a-132f, each including a beam and a member having a driving force is called a driving cantilever.

In this regard, the connection point between the second driving unit 130a and the first supporting unit 120 is point-symmetrical with the connection point between the second driving unit 130b and the first supporting unit 120. In addition, the connection point between the second driving unit 130a and the second supporting unit 140 is point-symmetrical with the connection point between the second driving unit 130b and the second supporting unit 140.

As illustrated in FIG. 7, the second driving units 130a and 130b are formed in such a manner that, on the faces of resilient members being of a silicon active layer 163 and a silicon oxide layer 164, bottom electrodes 201, piezoelectric units 202, and top electrodes 203 are formed in the +Z direction in the stated order. The top electrodes 203 and the bottom electrodes 201 are made of, for example, gold (Au), platinum (Pt), or the like. The piezoelectric units 202 are made of, for example, PZT (lead zirconate titanate) that is a piezoelectric material.

Returning to FIG. 5, the second supporting unit 140 is made of, for example, a silicon supporting layer 161, a silicon oxide layer 162, a silicon active layer 163, and a silicon oxide layer 164, and is a rectangular supporting member formed to surround the mirror unit 101, the first driving units 110a and 110b, the first supporting unit 120, and the second driving units 130a and 130b.

The electrode connecting members 150 are formed on, for example, the face of the second supporting unit 140 in the +Z direction, and are electrically connected with the respective top electrodes 203 and the respective bottom electrodes 201 of the first piezoelectric driving units 112a and 112b and the second piezoelectric driving unit 131a-131f and the control device 11 through electrode wires made of aluminum (Al) or the like.

Note that, concerning the present embodiment, the case where the piezoelectric units 202 are formed only on one side of resilient members being of the silicon active layer 163 and the silicon oxide layer 164 (on the faces in the +Z direction). However, the piezoelectric units 202 may be formed on the other face of the resilient members (for example, on the faces in the −Z direction) or may be formed on both of the one side and the other side of the resilient members has been described.

In addition, as long as it is possible to drive the mirror unit 101 around the first axis or around the second axis, the shapes of the respective elements are not limited to the shapes of the embodiment. For example, the torsion bars 111a and 111b or the first piezoelectric driving units 112a and 112b may have shapes having curvatures.

Furthermore, on at least any face from among the faces in the +Z direction of the top electrodes 203 of the first driving units 110a and 110b, the face of the first supporting unit 120 in the +Z direction, the faces of the top electrodes 203 of the second driving units 130a and 130b in the +Z direction, and the face of the second supporting unit 140 in the +Z direction, an insulating layer made of silicon oxide films may be formed. In this regard, by providing an electrode wire on the insulating layer, and, in addition, by partially removing the insulating layer or partially not forming the insulating layer to form an opening at a connection spot where a top electrode 203 or a bottom electrode 201 is connected with the electrode wire, it is possible to improve freedom in designing the first driving units 110a and 110b, the second driving units 130a and 130b, and the electrode wires, and to avoid short-circuiting between electrodes. Note that, as the insulating layer, any member can be used as long as the member has insulating property, and, may be provided with a function as a reflection preventing member implemented by reducing the thickness of the member or the like.

Next, control performed by the control device 11 to drive the first driving units 110a and 110b and the second driving units 130a and 130b of the light deflector will be described in detail. The piezoelectric units 202 of the first driving units 110a and 110b and the second driving units 130a and 130b deform (for example, expand or contract) in proportion to electric potentials of positive or negative voltages applied in polarization directions. Thus, the piezoelectric units 202 exert so-called inverse piezoelectric effect. The first driving units 110a and 110b and the second driving units 130a and 130b drive the mirror unit 101 using the inverse piezoelectric effect. In this regard, an angle at which a light beam incident on the reflecting surface 14 of the mirror unit 101 is deflected is called a deflection angle. A deflection angle represents a degree of deflection performed by the light deflector 13. Hereinafter, the deflection angle for when a voltage is not applied to the piezoelectric units 202 will be referred to as zero; a greater deflection angle than zero will be referred to as a positive deflection angle; a smaller deflection angle than zero will be referred to as a negative deflection angle.

First, control by the control device 11 to drive the first driving units 110a and 110b will be described.

In the first driving units 110a and 110b, in response to applying of driving voltages to the piezoelectric units 202 of the first piezoelectric driving units 112a and 112b through the top electrodes 203 and the bottom electrodes 201 in parallel, the piezoelectric units 202 deform. Thanks to the function of the piezoelectric units 202 due to deformation, the first piezoelectric driving units 112a and 112b are deformed to bend.

As a result, driving force around the first axis is generated to drive the mirror unit 101 as a result of twisting of the two torsion bars 111a and 111b; the mirror unit 101 thus moves around the first axis. Driving voltages applied to the first driving units 110a and 110b are controlled by the control device 11.

In this regard, by applying driving voltages of a predetermined waveform to the first piezoelectric driving units 112a and 112b of the first driving units 110a and 110b in parallel with the control device 11, it is possible to drive the mirror unit 101 around the first axis at a cycle of a predetermined sinusoidal wave. Furthermore, for example, by setting the predetermined waveform voltage to have a frequency of approximately 20 kHz on the same order as the resonance frequency of the torsion bars 111a and 111b, it is possible to cause the mirror unit 101 to resonate at approximately 20 kHz thanks to resonance of the torsion bars 111a and 111b in a twisting manner.

Figure 8C:
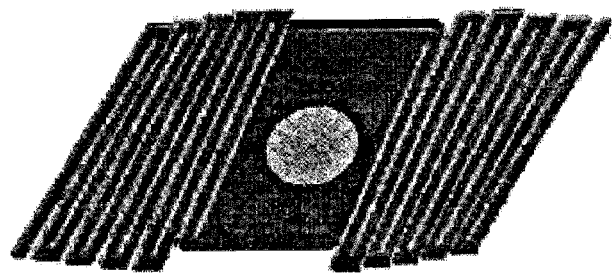
FIGS. 8A-8C diagrammatically illustrate a variant of a second driving unit of the light deflector.
Figure 8B:
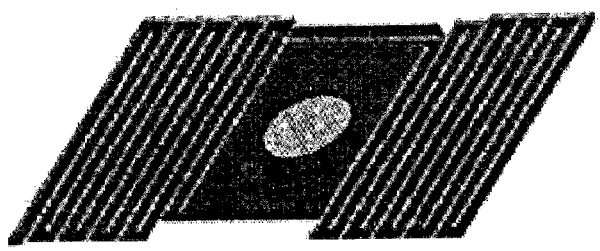
Figure 8A:
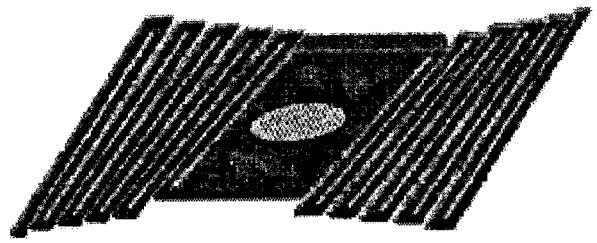

Next, with reference to FIGS. 8A-8C, control by the control device to drive the second driving units 130a and 130b will be described. FIGS. 8A-8C schematically illustrate a manner of driving of the second driving units 130a and 130b of the light deflector 13. The central circular zone illustrated in each of FIGS. 8A-8C represents the mirror unit 101 and so forth.

Among the plurality of second piezoelectric driving units 131a-131f of the second driving unit 130a, the second piezoelectric driving units even numbered from the second piezoelectric driving unit 131a closest in distance to the mirror unit 101, i.e., the second piezoelectric driving units 131b, 131d, and 131f will be referred to as a piezoelectric driving unit group A (also referred to as a first actuator).

Among the plurality of second piezoelectric driving units 132a-132f of the second driving unit 130b, the second piezoelectric driving units odd numbered from the second piezoelectric driving unit 132a closest in distance to the mirror unit 101, i.e., the second piezoelectric driving units 132a, 132c, and 132e will be also referred to as the piezoelectric driving unit group A. In response to driving voltages being applied in parallel, the piezoelectric driving unit group A is deformed to bend in the same direction, as illustrated in FIG. 8A, and the mirror unit 101 moves around the second axis to have a positive deflection angle.

Among the plurality of second piezoelectric driving units 131a-131f of the second driving unit 130a, the second piezoelectric driving units odd numbered from the second piezoelectric driving unit 131a closest in distance to the mirror unit 101, i.e., the second piezoelectric driving units 131a, 131c, and 131e will be referred to as a piezoelectric driving unit group B (also referred to as a second actuator).

Among the plurality of second piezoelectric driving units 132a-132f of the second driving unit 130b, the second piezoelectric driving units even numbered from the second piezoelectric driving unit 132a closest in distance to the mirror unit 101, i.e., the second piezoelectric driving units 132b, 132d, and 132f will also be referred to as the piezoelectric driving unit group B. In response to driving voltages being applied in parallel, the piezoelectric driving unit group B is deformed to bend in the same direction, as illustrated in FIG. 8C, and the mirror unit 101 moves around the second axis to have a negative deflection angle.

As illustrated in FIG. 8B, for a case where voltages are not applied or for a case where the moving force of the mirror unit 101 by the piezoelectric driving unit group A in response to voltages being applied is balanced with the moving force of the mirror unit 101 by the piezoelectric driving unit group B in response to voltages being applied, the deflection angle is zero.

As illustrated in FIGS. 8A and 8C, by using the second driving units 130a and 130b, it is possible to increase the deflection angle of the mirror unit 101 around the second axis by accumulating the moving forces generated from bending deformation of the plurality of piezoelectric units 202 of the piezoelectric driving unit group A or the plurality of piezoelectric units 202 of the piezoelectric driving unit group B. In addition, it is possible to drive the mirror unit 101 around the second axis by applying driving voltages to the second driving units 130a and 130b in a manner of continuously repeating the operations of FIGS. 8A-8C.

Figure 9:
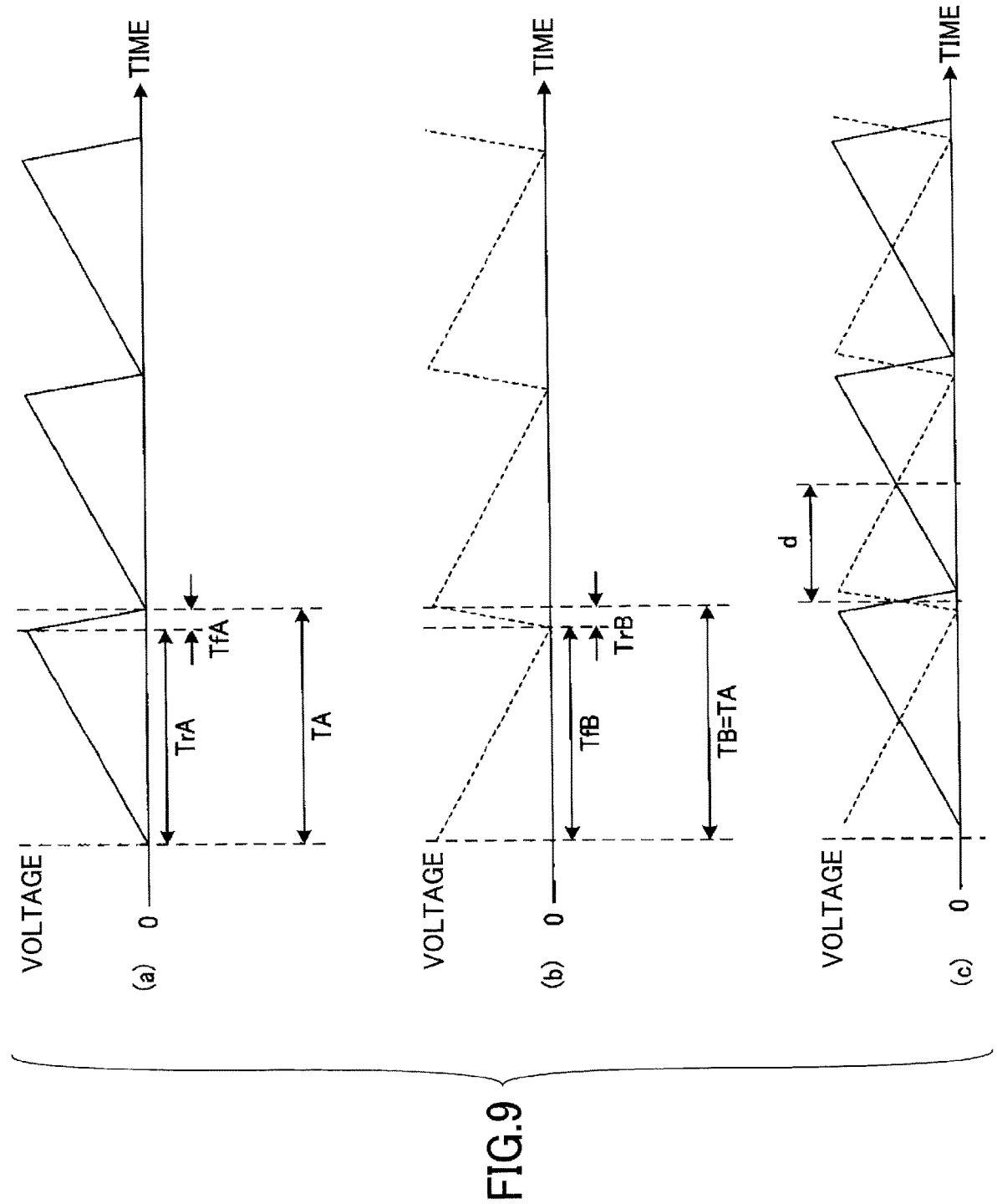
FIG. 9, (a) illustrates a graph of a waveform of a driving voltage A applied to a piezoelectric driving unit group A of the light deflector, (b) illustrates a graph of a waveform of a driving voltage B applied to a piezoelectric driving unit group B of the light deflector, and (c) illustrates the waveform of the driving voltage of (a) and the waveform of driving voltage of (b) in a superimposing manner.

The control device 11 controls driving signals (driving voltages) applied to the second driving units 130a and 130b. With reference to FIG. 9, driving voltages (hereinafter, referred to as "driving voltages A") applied to the piezoelectric driving unit group A and driving voltages (hereinafter, referred to as "driving voltages B") applied to the piezoelectric driving unit group B will be described. In this regard, an applying unit applying driving voltages A (first driving voltages) will be referred to as a first applying unit; an applying unit applying driving voltages B (second driving voltages) will be referred to as a second applying unit.

FIG. 9, (a) illustrates one example of a waveform of each of driving voltages A applied to the piezoelectric driving unit group A of the light deflector 13. FIG. 9, (b) illustrates one example of a waveform of each of driving voltages B applied to the piezoelectric driving unit group B of the light deflector 13. FIG. 9, (c) illustrates the waveforms of driving voltages A and the waveform of driving voltages B in a superimposing manner.

As illustrated in FIG. 9, (a), a waveform of driving voltages A applied to the piezoelectric driving unit group A is, for example, a waveform of a saw-tooth wave, and has a frequency of, for example, 60 Hz. The waveform of driving voltages A is such that, for example, a ratio is previously determined as TrA:TfA=8.5:1.5 where TrA denotes a time span of a rising period where a voltage increases from a local minimum value through the subsequent local maximum value; TfA denotes a time span of a falling period where a voltage decreases from a local maximum value through the subsequent local minimum value. In this regard, the ratio of TrA with respect to one cycle will be referred to as symmetry of driving voltages A.

As illustrated in FIG. 9, (b), a waveform of driving voltages B applied to the piezoelectric driving unit group B is, for example, a waveform of a saw-tooth wave, and has a frequency of, for example, 60 Hz. The waveform of driving voltages B is such that, for example, a ratio is previously determined as TfB:TrB=8.5:1.5 where TrB denotes a time span of a rising period where a voltage increases from a local minimum value through the subsequent local maximum value; TfB denotes a time span of a falling period where a voltage decreases from a local maximum value through the subsequent local minimum value. In this regard, the ratio of TfB with respect to one cycle will be referred to as symmetry of driving voltages B.

As illustrated in FIG. 9, (c), such settings are made that, for example, the cycle TA of a waveform of driving voltages A is the same as the cycle TB of a waveform of driving voltages B. In this regard, a driving voltage A and a driving voltage B have a phase difference d.

Note that, waveforms of saw-tooth waves of driving voltages A and driving voltages B are generated through, for example, superposition of sine waves. In addition, it is desirable that the frequency of driving voltages A and driving voltages B (a driving frequency fs) is a half-integer multiple of the lowest order natural frequency (f(1)) of the light deflector 13. For example, it is desirable that fs is any one of 1/5.5 times f(1), 1/6.5 times f(1), and 1/7.5 times f(1). By thus using a half-integer multiple, it is possible to suppress a vibration otherwise occurring due to a harmonic component of the driving frequency. Such a vibration adversely affecting optical scanning is called unwanted vibration.

According to the present embodiment, driving voltages having waveforms of saw-tooth waves are used as driving voltages A and B. However, it is not necessary to limit driving voltages A and B to have such waveforms. It is also possible to change waveforms depending on device characteristics of the light deflector 13. For example, it is possible to use driving voltages where vertexes of waveforms of saw-tooth waves are rounded, driving voltages where straight-line sections of waveforms of saw-tooth waves are changed to curved lines, or the like. In such a case, the symmetry is the ratio of a rising time span with respect to one cycle or the ratio of a falling time span with respect to one cycle. In this regard, whether to use a rising time span or a falling time span as a basis may be determined freely.

With reference to FIG. 10, an optical scanning system in the intermediate image forming apparatus 10 will now be described. FIG. 10 illustrates an optical scanning system in the intermediate image forming apparatus 10. In the intermediate image forming apparatus 10, light emitted from the light source device 12 is deflected by the light deflector 13 in two directions, and thus, as illustrated in FIG. 10, optical scanning is performed on the scannable area 16 including the effective scanning area 17 on the intermediate screen member 15. As described above, with respect to one direction (hereinafter, referred to as an "X-axis direction") of the above-mentioned two directions, optical scanning is performed on the intermediate screen member 15 through resonant high-speed driving of the reflecting surface 14 of the light deflector 13 according to a sine-wave driving signal. With respect to the other direction (hereinafter, referred to as a "Y-axis direction"), optical scanning is performed on the intermediate screen member 15 through non-resonant low-speed driving of the reflecting surface 14 of the light deflector 13 according to a saw-tooth-wave driving signal. Such a driving system where zigzag optical scanning is implemented through optical scanning in two directions is also called a raster scan system.

In the above-described driving system, it is desirable that, in the effective scanning area 17, optical scanning is performed at a constant speed in the Y-axis direction. This is because, if a scanning speed in the Y-axis direction were not constant, brightness unevenness or fluctuation might occur in a projected image, for example, upon image projection through optical scanning, resulting in degradation in the projected image. In order to implement such a constant scanning speed in the Y-axis direction, it is desired to make constant a moving speed of the reflecting surface 14 of the light deflector 13 around the second axis, i.e., it is desired to make constant a temporal change of a deflection angle of the reflecting surface 14 around the second axis in the effective scanning area 17.

Next, with reference to FIGS. 11 and 12, the intermediate image forming apparatus 10 according to the present embodiment will be described, and also, an image projection apparatus applying the intermediate image forming apparatus 10 will be described. FIG. 11 is a schematic diagram of an automobile 400 as a movable body in which a head-up display 500 that is one example of the image projection apparatus is installed, according to an embodiment.

Figure 12:
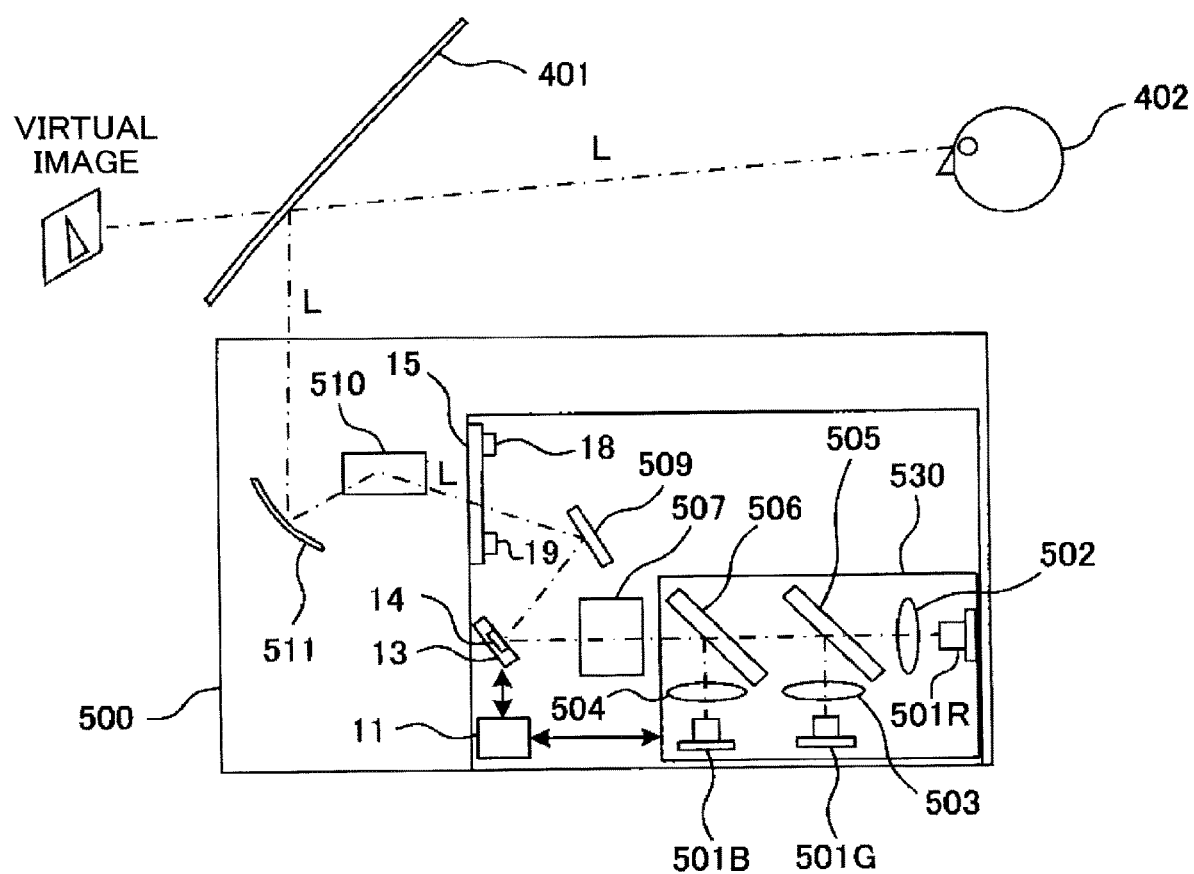
FIG. 12 is a schematic diagram illustrating one example of the head-up display.

FIG. 12 is a schematic diagram of one example of the head-up display 500.

As illustrated in FIG. 11, the head-up display 500 is installed, for example, near a windshield (a windshield 401 or the like) of the automobile 400. Projection light (image light) L emitted by the head-up display 500 is reflected by the windshield 401 and is directed toward an observer (a driver 402) who is a user. Thus, the driver 402 can see an image and so forth projected by the head-up display 500 as a virtual image. Note that, any other member having a function as a transmitting and reflecting member as the windshield 401 may be used instead. For example, a combiner as a transmitting and reflecting member may be installed on an inner surface of the windshield 401: the combiner allows the user to see a vertical image through image light reflected by the combiner.

As illustrated in FIG. 12, the head-up display 500 emits red laser light, green laser light, and blue laser light from laser light source devices 501R, 501G, and 501B. The emitted laser light passes through an incident optical system including collimator lenses 502, 503, and 504 provided for the respective laser light source devices 501R, 501G, and 501B, two dichroic mirrors 505 and 506, and a light intensity adjusting unit 507, and then, is deflected by the reflecting surface 14 of the light deflector 13. The deflected laser is then reflected by a plane mirror 509 and forms an intermediate image on the intermediate screen member 15. The laser light that forms the intermediate image is then transmitted by the intermediate screen member 15 and is used to project the intermediate image by a projection optical system that includes a cold mirror 510 as a plural-film optical member and a projecting mirror 511. On the intermediate screen member 15, a first photodetector 18 and a second photodetector 19 are installed: the corresponding light reception signals are used to adjust the intermediate image forming apparatus 10.

In the cold mirror 510, an optical multilayer is formed on a light transmission base material. The light transmission base material according to the embodiment is shaped like a planar plate and is made of a translucent synthetic resin or glass. The optical multilayer is an interference film formed through vapor deposition or the like on a reflecting surface of the light transmission base material. In more detail, the optical multilayer is formed as a result of thin films made of two or more types of optical materials having different complex refractive indexes being laminated on the reflecting surface of the light transmission base material. The complex refractive indexes of the optical materials used as the optical films have real parts and imaginary parts having wavelength dependency.

As the optical films, dielectric films or metal films may be used. The optical multilayer according to the present embodiment includes dielectric films made of, for example, at least one of silicon dioxide ($SiO_7$), titanium dioxide ($TiO_7$), and so forth, and is a multilayer film including ten or more layers. The film thickness of each of the layers is determined appropriately through, for example, computer calculation to obtain spectral characteristics to increase reflectance for visible light in comparison to reflectance for infrared light (in other words, to obtain spectral characteristics to transmit at least part of infrared light).

In the above-described head-up display 500, the laser light source devices 501R, 501G, and 501B, the collimator lenses 502, 503, and 504, and the dichroic mirrors 505 and 506 are unitized to a light source unit 530 by an optical housing.

The intermediate image forming apparatus 10 according to the present embodiment includes the light source unit 530, the light deflector 13, the control device 11, the plane mirror 509, and the intermediate screen member 15.

In the head-up display 500, an intermediate image displayed on the intermediate screen member 15 is projected onto the windshield 401 of the automobile 400, and thus, the driver 402 is allowed to see the intermediate image as a virtual image.

Laser light of the respective colors emitted by the laser light source devices 501R, 501G, and 501B is transformed to approximately parallel light through the respective collimator lenses 502, 503, and 504, and is combined by the two dichroic mirrors 505 and 506. The combined laser light is adjusted in light intensity by the light intensity adjusting unit 507, and then, is used to perform two-dimensional scanning by the light deflector 13 having the reflecting surface 14. Projection light (image light) L deflected by the light deflector 13 to be used to perform two-dimensional scanning is reflected by the plane mirror 509 and is focused onto the intermediate screen member 15 to form an intermediate image on the intermediate screen member 15.

The intermediate screen member 15 includes a micro-lens array where micro lenses are two-dimensionally arranged to cause image light L incident on the intermediate screen member 15 to diverge so as to enlarge the image.

In the light deflector 13, the reflecting surface 14 is moved in a reciprocating manner in 2-axis directions to deflect projection light L incident on the reflecting surface 14 so as to implement two-dimensional scanning with the projection light L. Driving of the light deflector 13 is controlled in synchronization with emitting of light by the laser light source devices 501R, 501G, and 501B.

Thus, the head-up display 500 has been described as an example of the image projection apparatus. However, the image projection apparatus may be an apparatus that projects through a plural-film optical member an intermediate image that is formed on an intermediate image formation member from light emitted from light source devices. For example, the image projection apparatus may be applied, in the same way, to a projector that projects an image onto a display screen; to a head-mount display that is installed on an installation member that is installed onto a head or the like of an observer and projects an image onto a reflecting and transmitting screen provided to the installation member or projects an image using an eye ball as a reflecting and transmitting screen; and so forth.

In addition, the image projection apparatus may be installed in not only a vehicle or an installation member, but also, for example, a movable body such as an airplane, a ship, a mobile robot, or the like, or an immovable body such as a work robot that does not move from a site and operates a driving target such as a manipulator.

Next, a configuration concerning polarization characteristics of image light that are a feature of the present embodiment will be described. Below, the directions perpendicular to the forward and backward directions of the automobile 400 and parallel to a horizontal direction will be referred to as x-directions; vertical directions will be referred to as y-directions; the forward and backward directions of the automobile 400 will be referred to as z-directions.

Figure 13:
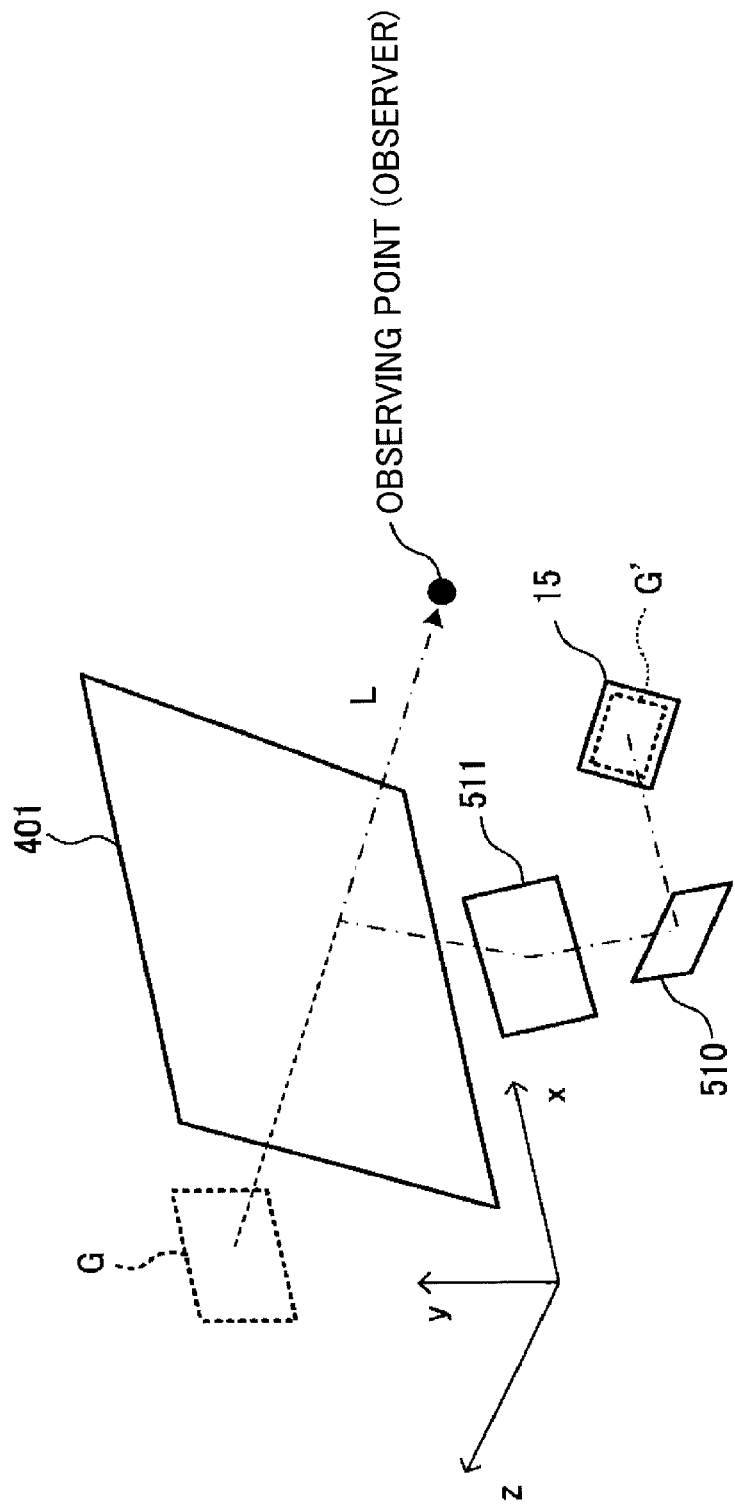
FIG. 13 illustrates an optical path along which intermediate image light passes through a cold mirror and a projecting mirror, is reflected by a windshield, and is directed toward an observer who is a user.

FIG. 13 illustrates an optical path of image light along which an intermediate image G' passes through the cold mirror 510 and the projecting mirror 511, is reflected by the windshield 401, and is directed toward the observer (the driver 402) who is the user.

The windshield 401 is gently curved in such a manner as to recede as a position varies in the right direction of the automobile 400 (an x-direction) from the center toward the right door and is curved in such a manner as to incline toward the back as a position varies upward of the automobile 400 (a y-direction). An image light reflecting area of the windshield 401 where image light exiting the projecting mirror 511 is reflected is off-center toward the driver's seat (rightward with respect to the front direction of the automobile 400) according to the present embodiment. In this regard, in a projected image (a virtual image) G reflected at the image light reflecting area and seen by the driver 402, an optical distortion factor to distort downward as a position varies outward from the center with respect to the left and right directions of the automobile 400 (the x-directions) is inherent.

Figure 14A:
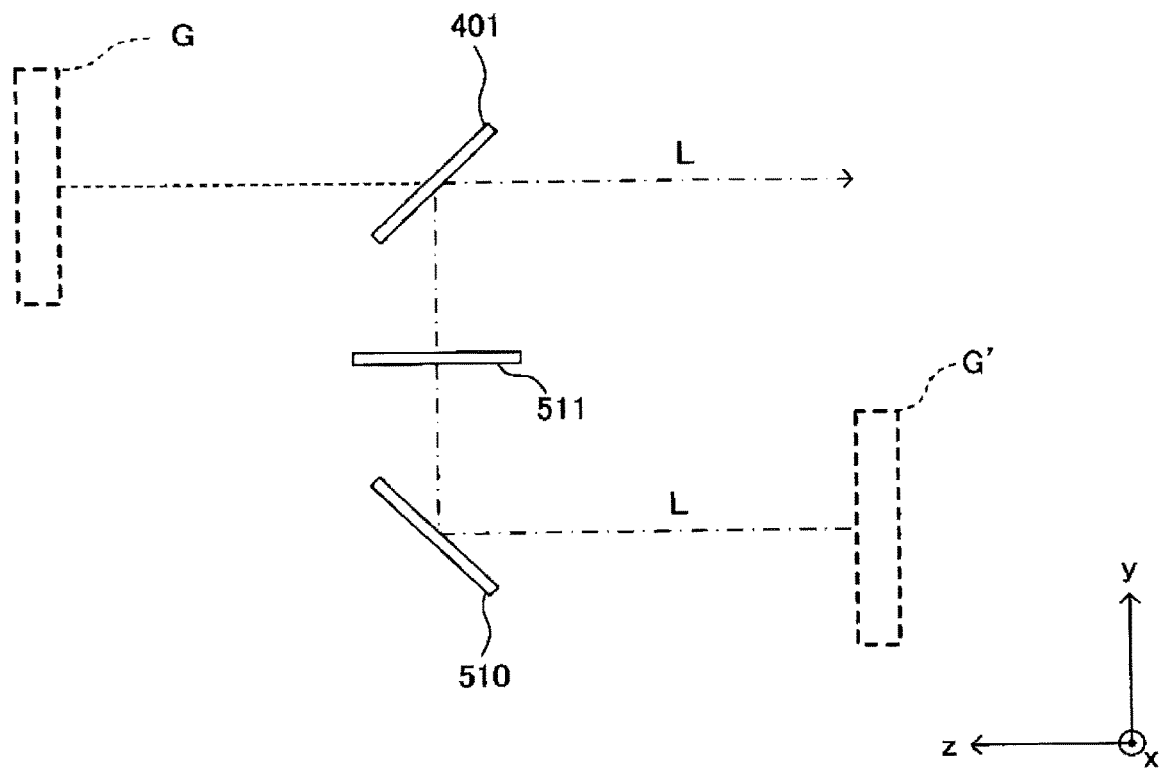
FIGS. 14A and 14B illustrate an equivalent optical path to which an optical path illustrated in FIG. 13 is changed optically equivalently in such a manner that an image plane of an intermediate image will be parallel to an image plane of a projected image.
Figure 14B:
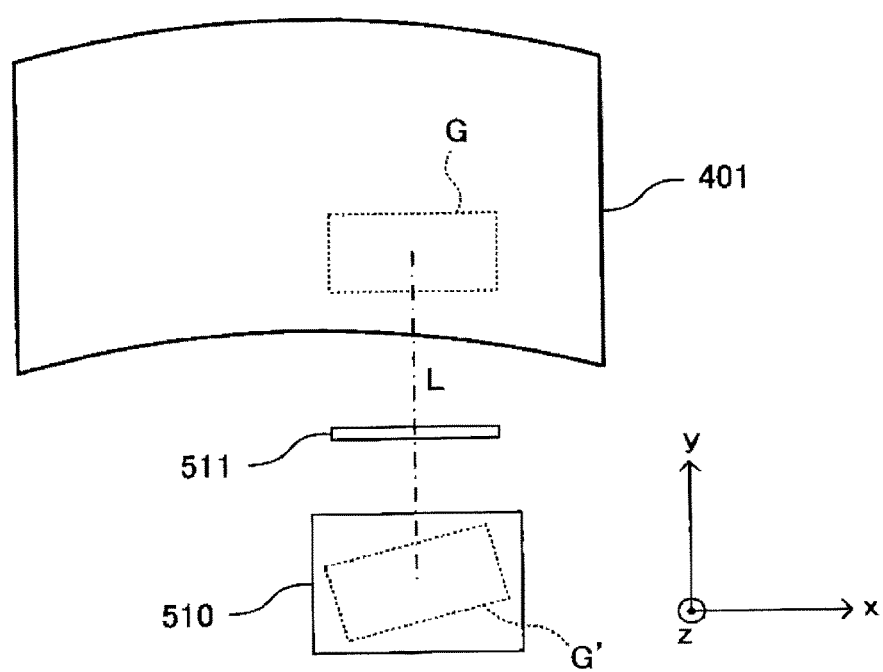
Figure 15:
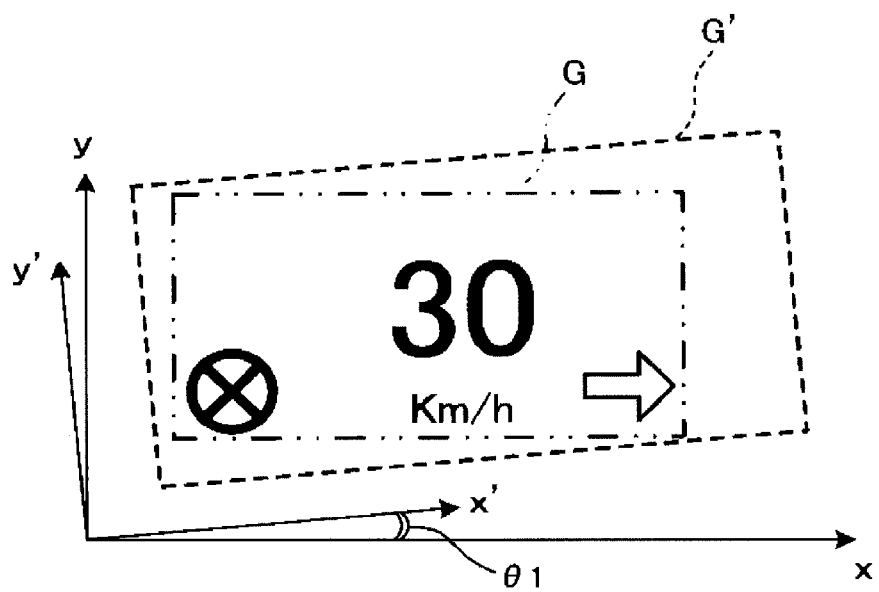
FIG. 15 illustrates an image rotational position relationship in a rotational direction around the image center axis between the projected image and the intermediate image in the equivalent optical path illustrated in FIGS. 14A and 14B by superimposing the projected image with the intermediate image.

FIGS. 14A and 14B illustrate an equivalent optical path changed optically equivalently from the optical path illustrated in FIG. 13 in such a manner that the image plane of an intermediate image G' becomes parallel to the image plane of a projected image (a virtual image) G. FIG. 15 illustrates, in a manner of superposing a projected image (a virtual image) G with an intermediate image G', an image rotational position relationship with respect to a rotation around the image center axis between the projected image G and the intermediate image G' with respect to the equivalent optical path illustrated in FIGS. 14A and 14B. On the equivalent optical path illustrated in FIGS. 14A and 14B, a light transmitting member replaces the projecting mirror 511. In FIG. 15, the vertical directions of the projected image (the virtual image) G are the same as the y-directions; the horizontal directions of the projected image (the virtual image) G are the same as the x-directions. In FIG. 15, the vertical directions of the intermediate image G' are referred to as y'-directions; the horizontal directions of the intermediate image G' are referred to as x'-directions.

According to the present embodiment, an image rotational position relationship in a rotational direction around the image center axis between a projected image (a virtual image) G and an intermediate image G' is such that a difference is provided between the rotational positions of the projected image G and the intermediate image G'. As illustrated in FIG. 15, with respect to the projected image (the virtual image) G, the intermediate image G' has a positional relationship of being rotated around the image center axis by an inclination angle θ1. The inclination angle θ1 falls within a range of approximately 5°≤θ1≤30°. By preparing an intermediate image G' to have such an image rotational position relationship, it is possible to cancel out the optical distortion factor inherent in a projected image (a virtual image) G reflected at the image light reflecting area of the windshield 401 and seen by the driver 402, and it is possible to allow the driver 402 to see the projected image (the virtual image) G that properly reflects the shape of the intermediate image G'.

In order to implement an above-described image rotational position relationship (with an inclination angle θ1) of an intermediate image G' with respect to a projected image (a virtual image) G, it is also possible to use a method of using image data of an image that is previously inclined by an inclination angle θ1, for example. In addition, it is also possible to obtain an intermediate image G' having an inclination angle θ1 by appropriately modifying control information for the light source device 12 and the light deflector 13 while image data itself is not modified to incline an image.

According to the present embodiment, an incident angle of image light incident on the windshield 401 after exiting the projecting mirror 511 is set to be approximately at Brewster's angle. As a result, the reflectance of a p-polarized light component with respect to reflection by the windshield 401 is very small. Therefore, in order to obtain a projected image G having high brightness by causing a greater amount of image light to be reflected by the windshield 401, it is desired to cause such polarized image light having a relatively great amount of a s-polarized light component with respect to reflection by the windshield 401 to be incident on the windshield 401.

According to the present embodiment, an arrangement is made such that the plane of incidence formed by the optical axis of image light incident on the windshield 401 after exiting the projecting mirror 511 is approximately parallel to the y-x plane. Therefore, an s-polarized light component with respect to reflection by the windshield 401 means polarized light of which the electric field vector is perpendicular to the plane of incidence formed by the optical axis of image light incident on the windshield 401 after exiting the projecting mirror 511. That is, according to the present embodiment, it is desirable to project, onto the windshield 401, polarized image light of which the polarization axis (the direction of the electric field vector) extends along a horizontal direction (an x-direction) for a projected image G (having a vertical direction same as a y-direction and a horizontal direction same as an x-direction).

In this regard, in a configuration of the related art, an arrangement is made such that the image rotational position relationship in a rotational direction around the image center axis between a projected image G and an intermediate image G' is such that there is no difference in the rotational positions. In other words, an intermediate image G' is formed for a projected image G in such a manner that an inclination angle θ1 will be zero. In the configuration of the related art, also concerning an intermediate image G', an arrangement may be made such that polarized image light of which the polarization axis is the same as a horizontal direction (an x'-direction) will exit the intermediate screen member 15. As a result, it is possible to project polarized light of which the polarization axis is the same as a horizontal direction of a projected image G (an x-direction) to the windshield 401 even through the cold mirror 510 is inserted on the optical path between the intermediate screen member 15 and the projecting mirror 511.

In more detail, if image light incident on the cold mirror 510 after exiting the intermediate screen member 15 included, in a mixed manner, an s-polarized light component and a p-polarized light component with respect to reflection by the cold mirror 510, the polarization state of image light exiting the cold mirror 510 would change due to the phase difference between the polarized light components. Furthermore, the changed polarization state would have a large variance due to an individual difference of the cold mirror 510 and would be irregular. Thus, if image light incident on the cold mirror 510 included, in a mixed manner, a s-polarized light component and a p-polarized light component, image light exiting the cold mirror 510, i.e., image light incident on the windshield 401, might include a polarized light component (a p-polarized light component with respect to reflection by the windshield 401) of which the polarization axis is not the same as a horizontal direction of a projected image G (an x-direction) by an amount greater than an allowable value. In such a case, an s-polarized light component with respect to reflection by the windshield 401 included in image light incident on the windshield 401 would be relatively small, light intensity reflected by the windshield 401 would be smaller, and it would be impossible to obtain a projected image G with high brightness.

In this regard, in the above-described configuration of the related art, an arrangement may be made such that the cold mirror 510 is placed in such a manner that the polarization axis of image light exiting the intermediate screen member 15 (i.e., polarized image light of which the polarization axis is the same as a horizontal axis (a x'-direction)) will be perpendicular to the plane of incidence formed by the optical axis of the image light incident on the cold mirror 510 after exiting the intermediate screen member 15. Thereby, a p-polarized light component with respect to reflection by the cold mirror 510 is not incident on the cold mirror 510. Thus, it is possible to suppress a change in the polarization state of image light exiting the cold mirror 510 occurring due to the phase difference between the polarized light components, and it is possible to project polarized image light (i.e., s-polarized light with respect to reflection by the windshield 401) of which the polarization axis is the same as a horizontal direction (an x-direction) to the windshield 401.

However, according to the present embodiment, instead of the above-described configuration of the related art, an arrangement is made such that the image rotational position relationship in a rotational direction around the image center axis between a projected image G and an intermediate image G' is such that a difference is provided in the rotational positions. That is, the inclination angle θ1 is not zero; an intermediate image G' is formed for a projected image G in such a manner that a x-direction and a y-direction of the projected image G are not the same as a x'-direction and a y'-direction of the intermediate image G'. In this case, the cold mirror 510 cannot be set in such a manner that the polarization axis of image light exiting the intermediate screen member 15 (i.e., polarized image light of which the polarization axis is the same as a horizontal direction (an x'-direction)) will be perpendicular to the plane of incidence formed by the optical axis of image light incident on the cold mirror 510 after exiting the intermediate screen member 15.

Therefore, according to the present embodiment, polarized image light (i.e., s-polarized light with respect to reflection by the cold mirror 510) of which the plane of polarization (i.e., the plane including the optical axis direction and the direction of the electric field vector of image light) of the image light exiting the intermediate screen member 15 is perpendicular to the plane of incidence formed by the optical axis of image light incident on the cold mirror 510 after exiting the intermediate screen member 15 is caused to be incident on the cold mirror 510. That is, an arrangement is made such that polarized image light of which the polarization axis is not the same as a horizontal direction (an x'-direction) of an intermediate image G' exits the intermediate screen member 15 and is incident on the cold mirror 510.

It is possible to implement such a configuration according to the present embodiment by providing a polarization adjusting unit such as a polarizer to adjust the plane of polarization of image light after exiting the intermediate screen member 15. However, it is more desirable to implement such a configuration according to the present embodiment by adjusting the plane of polarization of image light before being incident on the intermediate screen member 15. This is because, in a method of adjusting the plane of polarization of image light before being incident on the intermediate screen member 15, it is easier to suppress degradation in brightness of a projected image G occurring through polarization adjustment.

As a method to adjust the plane of polarization of light before being incident on the intermediate screen member 15, for example, a method of rotating the laser light source devices 501R, 501G, and 501B around the optical axes of laser light emitted by the laser light source devices 501R, 501G, and 501B of red, green, and blue, respectively, to adjust the plane of polarizations of laser light can be cited. Laser light emitted by the laser light source devices 501R, 501G, and 501B is polarized light having planes of polarization of predetermined directions, and therefore, through the method, it is possible to implement an adjustment such that polarized image light exiting the intermediate screen member 15 will be s-polarized light with respect to reflection by the cold mirror 510.

In addition, a method of, for example, inserting a polarization adjusting unit(s) such as a polarizer(s) on the optical paths between the laser light source devices 501R, 501G, and 501B and the intermediate screen member 15 can also be cited. Also through the method, it is possible to implement an adjustment such that polarized image light exiting the intermediate screen member 15 will be s-polarized light with respect to reflection by the cold mirror 510.

According to the present embodiment, it is possible to exclude a p-polarized light component with respect to reflection by the cold mirror 510 from image light incident on the cold mirror 510. Therefore, it is possible to suppress a change in the polarization state of image light exiting the cold mirror 510 occurring due to a phase difference between polarized light components. Thus, it is possible to avoid a situation where image light exiting the cold mirror 510 can include such a polarized light component (i.e., a p-polarized light component with respect to reflection by the windshield) of which the polarization axis is not the same as a horizontal axis of a projected image G (an x-direction) by an amount exceeding an allowable value.

In this regard, according to the present embodiment, the image rotational position relationship between a projected image G and an intermediate image G' is such that there is a difference in the rotational positions by an inclination angle θ1. Therefore, as a result of, as described above, polarized image light exiting the intermediate screen member 15 being made to be s-polarized light with respect to reflection by the cold mirror 510, the polarization axis of polarized image light exiting the intermediate screen member 15 is not the same as a horizontal direction of a projected image G (an x-direction). As a result, image light exiting the cold mirror 510 includes a polarized light component of which the polarization axis is different from a horizontal axis of a projected image G (an x-direction) (i.e., polarized light including a p-polarized light component with respect to reflection by the windshield 401) and is projected to the windshield 401. That is, image light projected to the windshield 401 after exiting the projecting mirror 511 includes a p-polarized light component (an unwanted polarized light component) that will not be reflected by the windshield 401. Therefore, the amount of an s-polarized light component (a wanted polarized light component) that will be reflected by the windshield 401 becomes relatively smaller by the amount of the p-polarized light component, and some degradation in brightness of the projected image G becomes unavoidable.

However, the amount of such an unwanted p-polarized light component included in image light exiting the cold mirror 510 is determined by the image rotational position relationship (the inclination angle θ1) between a projected image (a virtual image) G and an intermediate image G' and has a regular value. Furthermore, within the maximum possible angle range of an inclination angle θ1 according to the present embodiment, the amount of a thus-generated unwanted p-polarized light component is sufficiently lower than an allowable value.

Therefore, according to the present embodiment, it is possible to suppress a situation where a polarization state of light exiting the cold mirror 510 varies irregularly and a p-polarized light component (a p-polarized light component with respect to reflection by the windshield 401) unwanted for a projected image G exceeds the allowable value, while permitting a situation where an amount, on the order of lower than the allowable value, of a p-polarized light component (a p-polarized light component with respect to reflection by the windshield 401) unwanted for a projected image G is included.

Thus, according to the present embodiment, even for a case where polarized image light exiting an intermediate image forming member is projected through a plural-film optical member, it is possible to suppress a problem such as degradation in brightness of the projected image.

The embodiment of the present invention has been described. However, the above-described embodiment is one example to apply the present invention. The present invention is not limited to the above-described embodiment as it is, and it is possible to, at a time of implementation, modify or change the embodiment within the scope without departing from the spirit of the present invention.

The embodiment described above is one example, and has a unique advantageous effect for each of carrying-out modes that will now be described.

[First Carrying-out Mode]

An image projection apparatus (for example, the head-up display 500) according to a first carrying-out mode includes an intermediate image forming member (for example, the intermediate screen member 15) configured to form an intermediate image G' from light emitted by a light source device; and a plural-film optical member (for example, the cold mirror 510) on which image light that forms the intermediate image is incident. The image projection apparatus uses the image light that is incident on the plural-film optical member to projects an image (for example, a virtual image G), an image rotational position relationship in a rotational direction around an image center axis between the image that is projected and the intermediate image is such that a difference is present in image rotational positions (for example, an inclination angle θ1 is not zero), and the plural-film optical member is set in such a manner that a polarization axis of the image light incident on the plural-film optical member is parallel or perpendicular to a plane of incidence of the image light with respect to the plural-film optical member.

A configuration of the related art where an image rotational position relationship in a rotational direction around an image center axis between a projected image and an intermediate image is such that no difference is present in image rotational positions will now be considered. In such a configuration, for a case where, as described above, polarized image light of which the polarization axis has a predetermined direction relative to a projected image should be projected, an arrangement may be made such that polarized image light of which the predetermined polarization axis has the same predetermined direction relative to an intermediate image will exit an intermediate image forming member. Thereby, it is possible to project polarized image light of which the predetermined polarization axis has the predetermined direction relative to a projected image even if a plural-film optical member is set.

It is possible to make an arrangement such that the plane of polarization of image light (the plane including the optical axis direction and the oscillation directions of the electric field vector of the image light) exiting an intermediate image forming member will be parallel (p-polarized light) or perpendicular (s-polarized light) to the plane of incidence formed by the optical axis of image light incident on a plural-film optical member after exiting the intermediate image forming member. Therefore, by making such an arrangement, image light incident on the plural-film optical member is made substantially not to include the other polarized light component, and it is possible to suppress a change in the polarization state of image light exiting the plural-film optical member occurring due to a phase difference between polarized light components of an s-wave and a p-wave incident on the plural-film optical member. In this case, it is possible to maintain the polarization state of image light exiting the plural-film optical member to be the same as or similar to the polarization state of image light before being incident on the plural-film optical member. Therefore, it is possible to project image light polarized in such a manner that the polarization axis has a predetermined direction relative to a projected image.

In more detail, if image light incident on the plural-film optical member after exiting the intermediate image forming member included in a mixed manner a s-polarized light component and a p-polarized light component with respect to reflection by the plural-film optical member, the phase difference between the polarized light components would cause a change in the polarization state of image light exiting the plural-film optical member. Furthermore, the changed polarization state would have a large variance due to an individual difference of the plural-film optical member and would be irregular. As a result, if image light incident on the plural-film optical member included an s-polarized light component and a p-polarized light component in a mixed manner, image light exiting the plural-film optical member could include a polarized light component of which the polarization axis has a direction different from a predetermined direction relative to a projected image by an amount exceeding an allowable value. In such a case, an amount of a wanted polarized light component (a polarized light component of which the polarization axis has a predetermined direction relative to a projected image) included in image light exiting the plural-film optical member would be relatively small, and a defect such as degradation in brightness of a projected image would result. In this regard, in the above-described configuration of the related art, a polarized light component having the other polarization axis will not be incident on the plural-film optical member, by setting the plural-film optical member in such a manner that the polarization axis of polarized image light exiting the intermediate image forming member is parallel or perpendicular to the plane of incidence formed by the optical axis of image light incident on the plural-film optical member after exiting the intermediate image forming member. Therefore, it is possible to suppress a change in the polarization state of image light exiting the plural-film optical member occurring due to the phase difference between the polarized light components and it is possible to increase the amount of a wanted polarized light component (i.e., a polarized light component of which the polarization axis has a predetermined direction relative to a projected image) included in image light exiting the plural-film optical member.

However, according to the present carrying-out mode, instead of the above-described configuration of the related art, the arrangement is made such that the image rotational position relationship between a projected image and an intermediate image is such that there is a difference in the image rotational positions. In this case, if an arrangement were made such that polarized image light of which the polarization axis had a predetermined direction relative to an intermediate image would exit the intermediate image forming member for a case where polarized image light of which the polarization axis has the same predetermined direction relative to a projected image should be projected, the plural-film optical member cannot be set in such a manner that the polarization axis of image light exiting the intermediate image forming member will be parallel or perpendicular to the plane of incidence formed by the optical axis of image light incident on the plural-film optical member after exiting the intermediate image forming member.

Therefore, according to the present carrying-out mode, polarized image light of which the polarization plane (the plane including the optical axis direction and the directions of the electric field vector of image light) of the image light exiting the intermediate image forming member is parallel or perpendicular to the plane of incidence formed by the optical axis of image light incident on the plural-film optical member after exiting the intermediate image forming member is made to be incident on the plural-film optical member. Thus, it is possible to prevent a polarized light component having the other polarization axis from being incident on the plural-film optical member. As a result, it is possible to suppress a change in the polarization state of image light exiting the plural-film optical member occurring due to the phase difference between the polarized light components. Thus, it is possible to avoid a situation where image light exiting the plural-film optical member includes an amount, exceeding an allowable value, of an unwanted polarized light component of which the polarization axis has a direction not the same as a predetermined direction relative to a projected image.

According to the present carrying-out mode, as mentioned above, the image rotational position relationship between a projected image and an intermediate image is such that there is a difference in the image rotational positions. Therefore, the polarization axis of polarized image light exiting the intermediate image forming member is not the same as the polarization axis having a predetermined direction relative to a projected image as a result of the above-described polarized image light being made to exit the intermediate image forming member. As a result, image light exiting the plural-film optical member includes an unwanted polarized light component of which the polarization axis is not the same as the polarization axis having a predetermined direction relative to a projected image. That is, projected image light includes a polarized light component unwanted for a projected image. As a result, the amount of a polarized light component wanted for the projected image becomes relatively smaller by the amount of the unwanted polarized light component, and as a result, some degradation in brightness of the projected image or the like becomes unavoidable.

However, the amount of an unwanted polarized light component included in image light exiting the plural-film optical member is determined by the image rotational position relationship between a projected image and an intermediate image and has a regular value. Furthermore, within the range of the maximum possible image rotational position relationship according to the present carrying-out mode, the amount of a thus generated unwanted p-polarized light component is sufficiently lower than an allowable value.

Therefore, according to the present carrying-out mode, it is possible to suppress a situation where a polarization state of light exiting the plural-film optical member varies irregularly and a p-polarized light component unwanted for a projected image exceeds an allowable value while permitting a situation where an amount, on the order lower than the allowable value, of a p-polarized light component unwanted for a projected image is included.

[Second Carrying-out Mode]

A second carrying-out mode is different from the first carrying-out mode in that the plural-film optical member is an infrared light cutting reflecting member (for example, the cold mirror 510) that reflects incident light while cutting off an infrared light component from the incident light.

In the configuration using the infrared light cutting reflecting member as the plural-film optical member, it is possible to suppress a situation where a polarization state of light exiting the plural-film optical film varies irregularly and a p-polarized light component unwanted for a projected image exceeds an allowable value, while permitting a situation where an amount, on the order of lower than the allowable value, of a p-polarized light component unwanted for a projected image is included.

[Third Carrying-out Mode]

A third carrying-out mode is different from either of the first carrying-out mode and the second carrying-out mode in that a plane of polarization of light before being incident on the intermediate image forming member is adjusted in such a manner that the polarization axis of image light incident on the plural-film optical member is parallel or perpendicular to a plane of incidence of the image light with respect to the plural-film optical member.

Thereby, it is easy to suppress degradation in brightness of a projected image occurring due to adjustment of a plane of polarization.

[Fourth Carrying-out Mode]

A fourth carrying-out mode is different from the third carrying-out mode in that the light source device is configured to emit polarized light having a predetermined plane of polarization (for example, the laser source devices 501R, 501G, and 501B), and the rotational position around the optical axis of the polarized light emitted by the light source device is adjusted in such a manner that the polarization axis of the image light incident on the plural-film optical member is parallel or perpendicular to the plane of incidence of the image light with respect to the plural-film optical member.

Thereby, a plane of polarization can be easily adjusted.

[Fifth Carrying-out Mode]

The fifth carrying-out mode is different from the third carrying-out mode in that a polarization adjusting member (for example, a polarizer) is provided on an optical path between the light source device and the intermediate image forming member, the polarization adjusting member being configured to cause polarized light that has a plane of polarization adjusted in such a manner that the polarization axis of image light incident on the plural-film optical member is parallel or perpendicular to a plane of incidence of the image light with respect to the plural-film optical member to exit the polarization adjusting member.

Thereby, a plane of polarization can be easily adjusted.

[Sixth Carrying-out Mode]

A sixth carrying-out mode is different from any one of the first through fifth carrying-out modes in that a projection optical system (for example, the projecting mirror 511) configured to project image light having passed through the plural-film optical member onto a transmitting and reflecting member (for example, the windshield 401) is provided.

Thereby, it is possible to allow a user to see a projected image of high brightness through a transmitting and reflecting member such as a windshield of a movable body, a combiner, or the like.

[Seventh Carrying-out Mode]

A seventh carrying-out mode is a movable body (for example, the automobile 400) including an image projection apparatus according to any one of the first through sixth carrying out modes; and a windshield (for example, the windshield 401) as a transmitting and reflecting member.

Thereby, it is possible to implement a movable body that allows the user to see a projected image of high brightness.

Thus, the image projection apparatuses and the movable bodies have been described by the embodiments. However, the present invention is not limited to the embodiments, and various changes and modifications can be made within the scope of the present invention.

The present application is based on and claims priority to Japanese patent application No. 2018-050930 filed Mar. 19, 2018, the contents of which are incorporated herein by reference in their entirety.

What is claimed is:

1. An image projection apparatus, comprising:
    an intermediate image forming member on which an intermediate image is formed from light emitted by a light source device; and
    a plural-film optical member on which image light that forms the intermediate image on the intermediate image forming member is incident, wherein
    the image projection apparatus uses the image light that is incident on the plural-film optical member to project an image,
    an image rotational position relationship, in a rotational direction around an image center axis, between the image that is projected and the intermediate image is such that a difference is present in image rotational positions, and
    the plural-film optical member is set in such a manner that a polarization axis of the image light incident on the plural-film optical member is parallel or perpendicular to a plane of incidence of the image light with respect to the plural-film optical member.

2. The image projection apparatus according to claim 1, wherein
    the plural-film optical member includes an infrared light cutting reflecting member that reflects incident light while cutting off an infrared light component from the incident light.

3. The image projection apparatus according to claim 2, wherein
    a plane of polarization of light before being incident on the intermediate image forming member is adjusted in such a manner that a polarization axis of the image light incident on the plural-film optical member is parallel or perpendicular to the plane of incidence of the image light with respect to the plural-film optical member.

4. The image projection apparatus according to claim 3, wherein
    the light source device is configured to emit polarized light having a predetermined plane of polarization, and
    a rotational position around an optical axis of the polarized light emitted by the light source device is adjusted in such a manner that the polarization axis of the image light incident on the plural-film optical member is parallel or perpendicular to the plane of incidence of the image light with respect to the plural-film optical member.

5. The image projection apparatus according to claim 4, further comprising
    a projection optical system configured to project image light having passed through the plural-film optical member onto a transmitting and reflecting member.

6. The image projection apparatus according to claim 3, further comprising
    a polarization adjusting member on an optical path between the light source device and the intermediate image forming member, the polarization adjusting member being configured to cause polarized light that has the plane of polarization adjusted in such a manner that the polarization axis of the image light incident on the plural-film optical member is parallel or perpendicular to the plane of incidence of the image light with respect to the plural-film optical member to exit the polarization adjusting member.

7. The image projection apparatus according to claim 3, further comprising
    a projection optical system configured to project image light having passed through the plural-film optical member onto a transmitting and reflecting member.

8. A movable body comprising:
    the image projection apparatus according to claim 7; and
    a windshield as the transmitting and reflecting member.

9. The image projection apparatus according to claim 2, further comprising
    a projection optical system configured to project image light having passed through the plural-film optical member onto a transmitting and reflecting member.

10. A movable body comprising:
    the image projection apparatus according to claim 9; and
    a windshield as the transmitting and reflecting member.

11. The image projection apparatus according to claim 1, wherein
    a plane of polarization of light before being incident on the intermediate image forming member is adjusted in such a manner that a polarization axis of the image light incident on the plural-film optical member is parallel or perpendicular to the plane of incidence of the image light with respect to the plural-film optical member.

12. The image projection apparatus according to claim 11, wherein
    the light source device is configured to emit polarized light having a predetermined plane of polarization, and
    a rotational position around an optical axis of the polarized light emitted by the light source device is adjusted in such a manner that the polarization axis of the image light incident on the plural-film optical member is parallel or perpendicular to the plane of incidence of the image light with respect to the plural-film optical member.

13. The image projection apparatus according to claim 12, further comprising a projection optical system configured to project image light having passed through the plural-film optical member onto a transmitting and reflecting member.

14. The image projection apparatus according to claim 11, further comprising a polarization adjusting member on an optical path between the light source device and the intermediate image forming member, the polarization adjusting member being configured to cause polarized light that has the plane of polarization adjusted in such a manner that the polarization axis of the image light incident on the plural-film optical member is parallel or perpendicular to the plane of incidence of the image light with respect to the plural-film optical member to exit the polarization adjusting member.

15. The image projection apparatus according to claim 14, further comprising a projection optical system configured to project image light having passed through the plural-film optical member onto a transmitting and reflecting member.

16. The image projection apparatus according to claim 11, further comprising a projection optical system configured to project image light having passed through the plural-film optical member onto a transmitting and reflecting member.

17. A movable body comprising:

the image projection apparatus according to claim 16; and a windshield as the transmitting and reflecting member.

18. The image projection apparatus according to claim 1, further comprising a projection optical system configured to project image light having passed through the plural-film optical member onto a transmitting and reflecting member.

19. A movable body comprising:

the image projection apparatus according to claim 18; and a windshield as the transmitting and reflecting member.

20. The image projection apparatus of claim 1, wherein the intermediate image has a horizontal axis, and the polarization axis of the image light incident on the plural-film optical member is offset from the horizontal axis of the intermediate image formed by the image light incident on the plural-film optical member.

* * * * *